United States Patent
Simons et al.

(10) Patent No.: US 12,457,261 B2
(45) Date of Patent: Oct. 28, 2025

(54) NETWORK BROWSER ENGINE

(71) Applicant: StackBlitz, Inc., San Francisco, CA (US)

(72) Inventors: Eric Simons, San Francisco, CA (US); Albert Pai, San Francisco, CA (US); Dominic Elm, Stephanskirchen (DE); Kwinten Pisman, Zelzate (BE); Tomek Sulkowski, Kalinowa (PL); Sam Denty, Mayo (IE)

( * ) Notice: Subject to any disclaimer, the term of this patent is extended or adjusted under 35 U.S.C. 154(b) by 0 days.

(21) Appl. No.: 18/546,776

(22) PCT Filed: Feb. 12, 2022

(86) PCT No.: PCT/US2022/070646
§ 371 (c)(1),
(2) Date: Aug. 16, 2023

(87) PCT Pub. No.: WO2022/178499
PCT Pub. Date: Aug. 25, 2022

(65) Prior Publication Data
US 2024/0146797 A1    May 2, 2024

Related U.S. Application Data

(60) Provisional application No. 63/149,664, filed on Feb. 16, 2021.

(51) Int. Cl.
*H04L 67/01*    (2022.01)
*G06F 8/61*     (2018.01)
*G06F 9/50*     (2006.01)
*H04L 67/02*    (2022.01)

(52) U.S. Cl.
CPC ............... *H04L 67/01* (2022.05); *G06F 8/61* (2013.01); *G06F 9/5055* (2013.01); *H04L 67/02* (2013.01)

(58) Field of Classification Search
CPC ......... G06F 9/5055; G06F 8/61; H04L 67/02; H04L 67/01
See application file for complete search history.

(56) References Cited

U.S. PATENT DOCUMENTS 8,356,075 B2 *  1/2013  Balko ................. G06F 9/452
                                          709/204
8,429,191 B2    4/2013  Desai
(Continued)

FOREIGN PATENT DOCUMENTS

WO    2008148664 A1   12/2008
WO    2010127327 A1   11/2010
(Continued)

OTHER PUBLICATIONS

U.S. Appl. No. 17/929,754, filed Sep. 6, 2022, Eric Simons.
(Continued)

*Primary Examiner* — Andrew C Georgandellis

(57) ABSTRACT

An improved computing system is arranged for cross-origin network communications on a single computing device. The system includes a processor, a networking module, and memory with software instructions arranged to operate a local computing server resource on a first local domain, instantiate a relay mechanism that has an iFrame and an invisible window, instantiate a local web server on a second local domain, install a service worker on the invisible window, receive a request for information at the local web server, verify a presence of the local computing server resource on the first local domain, communicatively connect the second local domain to the iFrame, and directly communicate, via the at least one networking module, at least one message between the local computing server resource on the first local domain and the local web server on the second local domain using the relay mechanism.

14 Claims, 15 Drawing Sheets

(56) References Cited

U.S. PATENT DOCUMENTS

| | | | |
|---|---|---|---|
| 8,438,289 | B1 | 5/2013 | Grieve |
| 9,037,963 | B1* | 5/2015 | Chandi ............... H04L 67/02 715/234 |
| 9,619,307 | B2 | 4/2017 | Maltese |
| 9,697,188 | B2 | 7/2017 | Kolam |
| 10,783,019 | B1 | 9/2020 | Kedar |
| 10,915,343 | B2* | 2/2021 | Cinos ............... G06F 9/45558 |
| 11,010,822 | B2 | 5/2021 | Chandi |
| 2004/0177147 | A1* | 9/2004 | Joshi ............... H04L 9/40 709/227 |
| 2009/0327421 | A1 | 12/2009 | Fu |
| 2013/0060885 | A1 | 3/2013 | Fu |
| 2013/0097440 | A1 | 4/2013 | Bar-Zeev |
| 2014/0245134 | A1* | 8/2014 | Portnoy ............... G06F 9/546 715/240 |
| 2019/0104194 | A1* | 4/2019 | Imm ............... H04L 67/01 |
| 2019/0378203 | A1 | 12/2019 | Chandi |
| 2020/0193042 | A1 | 6/2020 | Johns |
| 2020/0220875 | A1* | 7/2020 | Harguindeguy ...... H04L 63/101 |
| 2021/0067494 | A1* | 3/2021 | Azulay ............... H04L 63/1466 |

FOREIGN PATENT DOCUMENTS

| | | | |
|---|---|---|---|
| WO | 2015024490 | A1 | 2/2015 |
| WO | 2019068055 | A1 | 4/2019 |

OTHER PUBLICATIONS

U.S. Appl. No. 17/650,842, filed Feb. 11, 2022, Eric Simons.

Ardesh Verma; "Browsix: Now Run A Unix-like Open Source Operating System In Your Browser"; Dec. 12, 2016; pp. 1-4; Retrieved on Jul. 31, 2022 from: https://fossbytes.com/browsix-unix-like-operating-system-web-browser/.

Alan Grosskurth, Michael W. Godfrey; "A Reference Architecture for Web Browsers"; Sep. 25, 2005; pp. 1-4; Retrieved on Nov. 27, 2021 from: https://www.semanticscholar.org/paper/A-reference-architecture-for-Web-browsers-Grosskurth-Godfrey/62860d3ed11ad90db273f62c2b9da26a122c5881.

Alan Grosskurth, Michael W. Godfrey; "A reference architecture for web browsers"; 2006; pp. 1-19; Retrieved on Nov. 27, 2021 from: https://plg.uwaterloo.ca/~migod/papers/2006/jsme-browserRefArch.pdf.

Johannes Bader; "How to run Node.js (apps) in the browser?"; Nov. 22, 2017; pp. 1-9; Retrieved on Nov. 29, 2021 from: https://blog.cloudboost.io/how-to-run-node-js-apps-in-the-browser-3f077f34f8a5.

EPO (Rijswijk) English language version of the International Search Report, Form PCT/ISA/210, for International Application PCT/US2022/070646, Feb. 12, 2022 (3 pages).

EPO (Rijswijk) English language version of the International Search Report and Written Opinion, Form PCT/ISA/220, for International Application PCT/US2022/070646, Feb. 12, 2022 (16 pages).

\* cited by examiner

NETWORK BROWSER ENGINE

CROSS-REFERENCE TO RELATED APPLICATIONS

This application claims the benefit of U.S. Provisional Application No. 63/149,664, filed Feb. 16, 2021, which application is hereby incorporated by reference in its entirety.

BACKGROUND

Technical Field

The present disclosure generally relates to improved network computing. More particularly, but not exclusively, the present disclosure relates to an improved network browser engine arranged with server-side functionality that permits static information storage and retrieval via a single network link.

Description of the Related Art

Conventional network computing includes a local computing device operated by a user, a network, and one or more computing servers located remotely from the local computing device. The local computing device is often referred to as a desktop computer, a laptop computer, a tablet, a smartphone, or some other local computing device. The network is often referred to as a personal area network (PAN), a local area network (LAN), a wide area network (WAN), a cellular network, a wired network, a wireless network, or any combination thereof. The remotely located computing server(s) are often referred to individually and collectively as a web server, a server farm, the cloud, or the like. In at least some cases, the combination of a network and a plurality of computing servers is referred to as the "world wide web," the "internet," or some other like term.

The local-computing-device, network, and computing-server framework lends itself to a style of computing known as a server-based approach. Server-based approaches permit the execution of complex, computationally intensive operations in the cloud at the direction of, and for the benefit of, a less sophisticated local computing device. Along these lines, a local computing device may also be referred to as a "thin client." While a thin client may have any desired level of complexity, generally speaking, the thin client only requires rudimentary processing power, a suitable amount of memory, network connectivity, and a user interface.

One common method of thin client, server-based computing is to run on a cloud server any code that requires a certain minimum level of operating system (O/S) access. Then, after the cloud server executes the code, the cloud server communicates the static results of such execution down to a web browser of the thin client. Certain online development environments provide O/S resources in this way, including, for example, GITHUB CODESPACES, REPL.IT, and CLOUD9. The web browser of the local computing device simply displays a user interface, which serves as a remote display and remote control interface for a physical computing server running remotely in the cloud. Commands entered via the user interface of the local computing device are not saved or executed using the local computing device's memory or processor. Instead, control information representing the desired commands are sent to a remote computing server of the cloud, and the remote computing server sends back static information (e.g., terminal output, filesystem listing, and the like).

FIG. 1 is a block diagram illustrating a conventional server-based approach to computing 10. A local computing device 12 communicates through a computing network 14 with a cloud computing environment having a domain name server 16 and one or more remote computing servers 18.

The local computing device 12 includes various hardware structures formed of analog and digital electronic circuitry. The hardware structures include a processor 20 and memory 22. The memory 22 is directly or indirectly coupled to the processor 20 via a memory interface 24. Wired, wireless, or wired and wireless communications circuitry 26 allows the local computing device 12 to communicate with the domain name server 16 and any one or more of the remote computing servers 18a-18n via the computing network 14. User interface circuitry 28 (e.g., display, keyboard, mouse, touch screen, microphone, speaker, tactile output, tactile sensor, biometric sensor, and the like) permits a user 98 to interact with the local computing device. The user 98 may be a human user 98a, another computing device 98b, or some other user. Other hardware 30 of the local computing device (power supply, data bus(ses), timing circuitry, security circuitry, and the like) known to those of skill in the art is not expressly identified to avoid unnecessarily cluttering the figure.

The memory 22 of the local computing device 12 includes control information, fixed data, working data, and any other type of data generally found or created in a computing device. The memory 22 also includes software executable by the processor 20, Such software includes an operating system 32, a file system 34, a web browser 40, and user interface software 36. Other software and data 38 (e.g., power supply control software, security software, firmware, user applications, user data, and the like) known to those of skill in the art is not expressly identified to avoid unnecessarily cluttering the figure.

In an exemplary case, a user 98 has a desire to interact with the world wide web. The user's local computer 12 operates as a thin client in a client server model. The world wide web is implemented via the computing network 14, at least one domain name server 16, and any number of remote computing servers 18. Software instructions stored in memory 22 and accessed via the file system 34 are passed through the memory interface 24 and executed by processor 20. The software instructions include code that carries out the functions of an operating system 32, and the operating system 32 instantiates and manages the operations of various software applications. Some software applications instantiated and managed by the operating system 32 form the user interface, and another software application instantiated and managed by the operating system 32 is web browser 40.

The user 98, via cooperation of the user interface hardware 28 and user interface software 36, directs operations of the web browser 40. One operation performed by the user 98 is a request that information from a particular website be presented on a display screen. Using a keyboard, the user types the selected website name such as VVWW.MSN.COM, which is also referred to generically as a uniform resource locator (URL). The request, including the URL, is formatted at a first level via the web browser 40 software and further formatted at a second level via the communications circuitry 26. The communications circuitry 26 cooperates with a first bidirectional communications medium 42a to advance the request for information through the computing network 14. Known hardware of the computing network 14 recognizes the request as a URL (i.e., a website name) and passes the URL of the request via a second bidirectional communications medium 42*b* to a domain name server 16. The domain name server 16 receives the URL (e.g., HTTP://WWW.MSN.COM), performs a lookup of the website name (i.e., the URL), and returns a network computer address (i.e., an internet protocol (IP) address such as 204.79.197.203) of a web server corresponding to the desired website (e.g., HTTP://WWW.MSN.COM). Other known hardware of the computing network 14 recognizes data returned from the domain name server 16 as an IP address and routes the request for information via a third bidirectional communications medium 42*c* to the correct remote computing server 18*a*-18*n* corresponding to the IP address. The appropriate remote computing server 18*a*-18*n* operates web server software that interprets the request for information and returns files or other data back through the computing network 14 to the local computing device 12. The received information is processed by the web browser and presented to the user 98 via the user interface hardware 28 (e.g., display circuitry and a display screen) and user interface software 36.

FIG. 2 is a block diagram illustrating the architecture of the conventional web browser 40 of FIG. 1 in communication with the architecture of a conventional web server 70. Any number of web servers 70 are instantiated within any one or more of the remote computing servers 18*a*-18*n*.

The conventional web browser 40 is arranged to run on diverse types of local computing devices 12 (FIG. 1), including desktop computers, tablet computers, smart phones, and other fixed and mobile computing devices. Users 98 (FIG. 1) deploy web browsers 40 to access resources stored or otherwise available on web servers 70 of the world wide web ("web"). Each resource on the web is identified by a unique uniform resource identifier (URI), a uniform resource locator (URL), or both a URI and URL.

As is known to those of skill in the art, a uniform resource identifier (URI) is a unique sequence of characters (e.g., hexadecimal numbers, American Standard Code for Information Interchange (ASCII) identifiers, or the like) that identifies a logical or physical resource available for use on the web. URIs may be used to identify anything, including real-world objects, computational hardware (e.g., printers, scanners, and the like), people, and places, concepts, and information resources such as web pages, programs, and the like. In addition to identifying a particular resource, some URIs also provide a means of locating and accessing the resource (e.g., retrieving information from an information resource on the world wide web or some other network), and these URI's with address information are referred to as uniform resource locators (URLs). Hence, a URL provides the location of a particular resource, and a URI identifies the resource by name at the specified location or URL.

Users interact with their web browser 40, which communicates URI information, URL information, or both URI and URL information, to one or more web servers 70 operating in one or more remote computing servers 18. In this case, the user, via the web browser 40 and local computing server 12, may request delivery of multimedia (e.g., documents, videos, images, sound, and the like), to execute certain software, or to perform other functions.

Document resources on the web are often written using HyperText Markup Language (HTML), which allows the author to control the appearance of the delivered document and to embed hypertext links to other documents or different places in the same document. Data is often transmitted via HyperText Transfer Protocol (HTTP), which is a stateless and anonymous means of information exchange.

Although HTML is a relatively simple language for encoding web pages, other technologies may be used to improve the visual appearance and user experience of the web. Cascading Style Sheets (CSS), for example, allow web page authors to add layout and style information to web pages without complicating the original structural markup. And JavaScript, for example, is a host environment for performing client-side computations. Scripting code is embedded within HTML documents, and the corresponding displayed web page is the result of evaluating the JavaScript code and applying it to the static HTML constructs. Certain other types of content on the web (e.g., "flash" animations, "Java applets," and the like) cannot be rendered directly by the web browser 40, but "plugins," which are small programs that cooperate with the web browser 40, are used to embed such content in a web page. Other known features of the web browser 40 include software to keep track of recently visited web pages, software to "bookmark" certain web pages of interest to a user, the ability to store frequently used data and auto-populate certain fields of a web page with such data, software to block certain web content (e.g., pop-up windows, advertising, malicious content, illicit content, and the like), software to concurrently maintain communications with a plurality of web sites, and other features.

Turning back to FIG. 2, a conventional web browser includes eight distinct and interdependent subsystems. A user interface 44 is a software layer between a user 98 (FIG. 1) and the browser engine 46. Multimedia controls are provided by the user interface 44 software, which may include any one or more of toolbars, interactive dialog boxes, page-load progress icons, videos, images, graphics, sound, tactile feedback, and the like. In at least some cases, the user interface 44 is integrated with other functions of the local computing devices as administered by the operating system 32 such as printing, downloading and saving files, and the like.

The browser engine 46 subsystem is an embedded or embeddable software component that provides a high-level interface to the rendering engine 48. The browser engine 46, with interaction of the user 98 (FIG. 1) via user interface 44, may allow entry of uniform resource locator (URL) and uniform resource identifier (URI) information, and in some cases, the browser engine 46 of a conventional web browser 40 may also supports rudimentary browsing functions such as forward, back, and reload. In the alternative, or in addition, the browser engine 46 of the conventional web browser 40 is arranged to provide hooks for viewing any number of aspects of the browsing session such as popup windows, current page load progress, JavaScript alerts, and the like. The browser engine 46 may also, in some cases, enable querying and manipulation of rendering engine 48 settings (e.g., zoom, pause, playback, playback speed, and the like).

The rendering engine 48 is a software subsystem arranged to produce a multimedia (e.g., image, video, audio, tactile) representation for a given URI. The rendering engine 48 can display representations generated from HTML and extensible markup language (XML) documents. Such documents may further receive support from an optional HTML parsing module 50, an optional CSS module 52, embedded content (e.g., images, audio, and the like). The rndering engine is further arranged to calculate an exact page layout using one or more "re-flow" algorithms to adjust the display of elements on the web page with respect to the display hardware.

Networking module 54 enables any suitable number of file transfer protocols such as HTTP, simple mail transfer protocol (SMTP), internet message access protocol (IMAP), file transfer protocol (FTP), and others. The module is arranged to translate between different character sets, resolve multipurpose internet mail extension (MIME) media types for files, and perform other communication support functions. In at least some cases, the networking module 50 is arranged to cache recently retrieved resources for fast and efficient re-use. In at least some cases, the networking module 54 includes all or at least a portion of communications circuitry 26 (FIG. 3).

The JavaScript interpreter 56 is software executed to interpret JavaScript code embedded in web pages. JavaScript is an object-oriented scripting language developed to allow web pages to go beyond static HTML/CSS content and add simple animations, video games, user interactions, and the like. JavaScript facilitates the addition of interactive user behavior to web pages. Beyond websites and interactive user applications, software developers can also use JavaScript to build simple web servers and develop the back-end infrastructure using Node.js.

An extensible markup language (XML) parser 58 parses XML documents into a document object model (DOM) tree. As known by those of skill in the art, XML is a markup language that is both human-readable and machine-readable and used to store and transport data.

A display backend 60 subsystem provides support for rendering web pages on associated display hardware. The display backend 60 provides drawing and windowing primitives, user interface widgets, fonts, and other display-centric tools.

Finally, a data persistence repository 62 stores data of any type, format, and quantity as determined by the web page developer. Data stored in the data persistence repository 62 includes both high-level data such as bookmarks, toolbar or other display settings, browser settings, and the like and low-level data such as cookies, security certificates, and cached web page content.

As earlier disclosed, the architecture of any number of conventional web servers 70 is embodied in any number of remote computing servers 18. Though not illustrated in the present figures, it is understood by those of skill in the art that a computing server 18*a*-18*n* has a similar structure to a local computing device 12 in that both devices include processing circuitry, memory, communications hardware, and other such circuitry along with corresponding software to enable the resident hardware. In at least some cases, however, the remote computing devices have enhanced computing resources such as greater processing power, more memory, faster memory, more efficient networking capabilities, and the like. Accordingly, the convention web server 70 of FIG. 2 includes software that is executed in a known way by hardware and other software (not shown) of a known type.

The conventional web server 70 is a collection of software modules arranged to accept HTTP requests from clients such as web browser 40 and serve them HTTP responses along with optional data contents, such as HTML documents and linked objects (e.g., images, video, and the like). Known conventional web servers include APACHE, MICROSOFT IIS, and SUN JAVA SYSTEMS WEB SERVER.

Core functionality of the web server 70 includes an HTTP protocol module 72, an HTTP core module 74, an HTTP main server loop 76, and an HTTP request module 78. Additional functionality of web server 70, which may itself standalone or be integrated with web server 70, includes a server-side JavaScript runtime environment 80 (i.e., a "container"). The server-side JavaScript runtime environment 80 includes a JavaScript engine 82, a Node.js binding module 84, a Node.js core library 86, and a set of asynchronous input/output (I/O) 88 utilities.

In operation, a user 98 (FIG. 1) interacts with a local computing device 12 (FIG. 1) via a web browser 40. Information input or otherwise directed by the user enters the web browser 40 via user interface 44. The information is passed to a browser engine 46. Optionally, the information is additionally, or alternatively, stored in the data persistence repository 62. In at least some cases, information from the user 98 includes URI or URL information, which is communicated in cooperation with the networking module 54 through the computing network 14 as an HTTP request to a remote computing server 18. An HTTP protocol module 72 of web server 70 pre-processes the HTTP request. An HTTP main server loop 76 queues the request for processing by an HTTP core module 74, and an HTTP request module 78 fulfills the request by serving a web page, which is communicated as static data back through the computing network 14 and the networking module 54. The data of the web page is processed by the rendering engine 48 of the web browser 40 with assistance, if needed, from any of the HTML module 50, CSS module 52, and XML parser 58. Multimedia data of the web page is presented to the user 98 via the display backend 60 and corresponding hardware.

In some cases, the served web page includes JavaScript software instructions, which are processed by the JavaScript interpreter 56. In this case, as in many cases, the JavaScript invokes server-side resources by communicating one or more additional HTTP requests through the computing network 14 back to the web server 70. Alternatively, data embedded in the web page is processed by the web server 70 prior to communicating the web page data back to the web browser 40. In either case, the HTTP request module 78, or some other code of the web server 70, communicates the JavaScript instructions to the JavaScript engine 82. The JavaScript engine 82 interprets the scripts, binds particular resources via the Node.js binding module 84, invokes utilities of the Node.js core library, and performs the necessary action, which optionally includes asynchronous I/O 88. In many cases, the work performed by the server-side JavaScript code is complex, voluminous, resource-intensive, or otherwise suited toward implementation on the computing server 18 rather than the local computing device 12. Results of the executed JavaScript, which in at least some cases includes dynamic web page content, are communicated back to the web browser 40.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

Conventional server-style network programming relies on operating system application programming interface (APIs) calls to perform certain functions. An exemplary and non-exhaustive list of such functions includes file system operations (e.g., read, write, create, delete, and the like), shell scripting operations, synchronous multithreading operations, server operations (e.g., starting, pausing, resetting, stopping, and the like of transmission control protocol (TCP) servers, hypertext transfer protocol (HTTP) servers, and other servers), security operations (transport layer security (TLS), secure socket layer (SSL), and the like), encryption/decryption operations, machine learning operations, image recognition operations, virtual/augmented reality operations, and the like. To prevent or at least reduce the likelihood of any one of these operations from mistakenly or maliciously impacting the functioning of another, these operations are performed in a secure container (e.g., a sandbox, web security sandbox, quarantine space, and the like). In at least some cases, the secure container is formed as an iFrame. The device, method, and system embodiments described in this disclosure (i.e., the teachings of this disclosure) enable the local execution of network-style software programs within a secure container of a web browser engine operating on a local computing device. In this way, a same set of arbitrary, untrusted code that accesses operating system APIs can be executed by either or both a conventional web server 70 of a remote computing server 18 and an improved web browser 140 operating on an improved local computing device 112.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

In the present disclosure, for brevity, certain sets of related figures may be referred to as a single, multi-part figure to facilitate a clearer understanding of the illustrated subject matter. For example, FIGS. 7A-7B may be individually or collectively referred to as FIG. 7. FIGS. 8A-8C may be individually or collectively referred to as FIG. 8. FIGS. 9A-9D may be individually or collectively referred to as FIG. 9. Structures earlier identified are not repeated for brevity.

DETAILED DESCRIPTION

Figure 1:
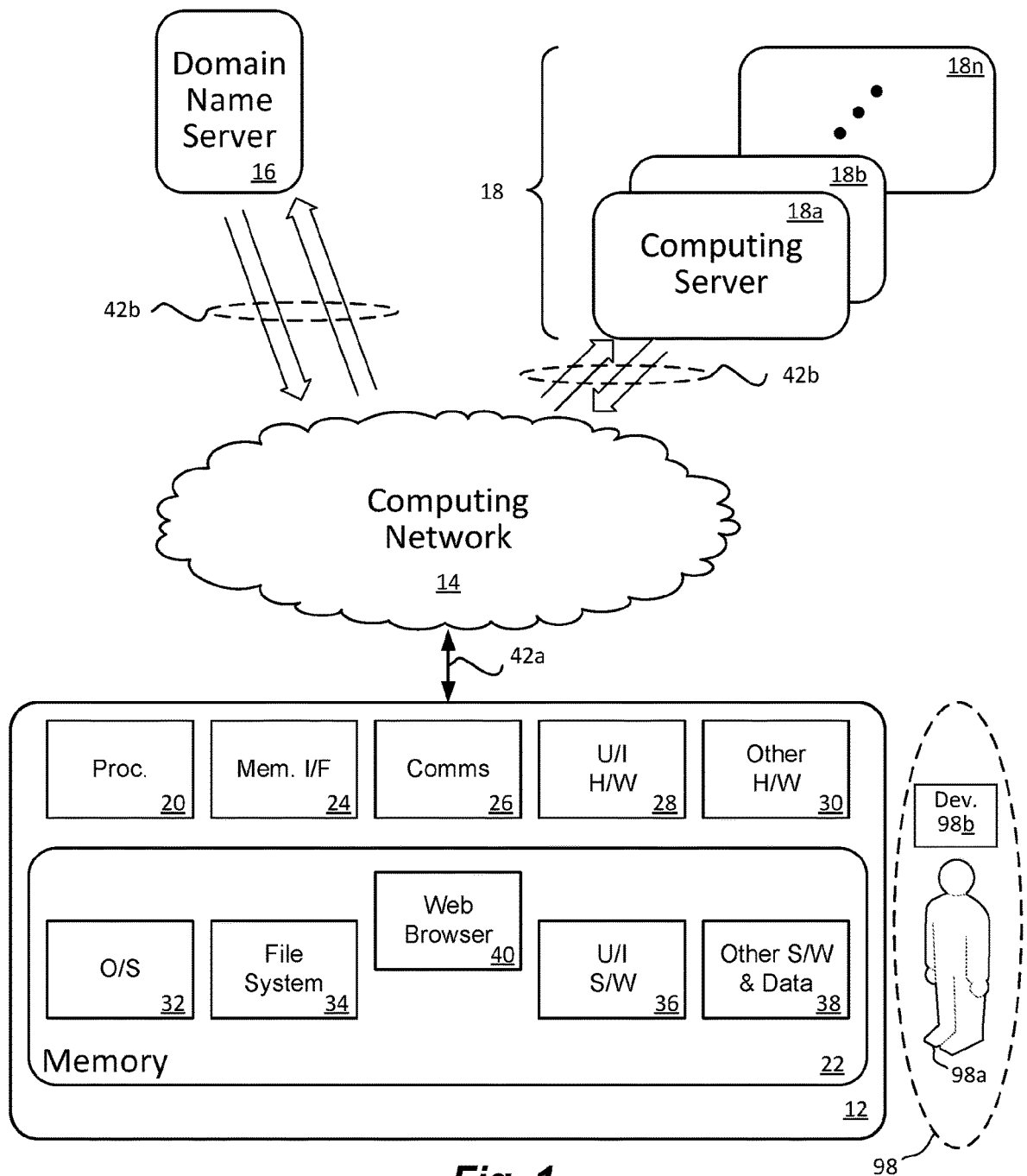
FIG. 1 is a block diagram illustrating a conventional server-based approach to computing.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring more detailed descriptions of the embodiments.

The present inventors have recognized certain flaws and shortcomings in conventional network computing, thin clients, and known server-based approaches to conventional JavaScript computing. Remote computing servers, for example, are expensive to run, they incur latency, and they require an internet connection to be fully functional in the execution of server-based software. Conventional in-browser solutions fail to provide many application programming interfaces (APIs) that enable and implement useful functionality for more advanced programming tasks. Full, or nearly full, transmission control protocol (TCP) APIs, for example, are necessary in certain circumstances, but TCP APIs that are provided in a web browser, if any, are not built on a shared atomic/synchronous process model akin to what is available in a local operating system (O/S). The in-browser TCP API's fail to provide the full API surface of a local operating system, and because of this, non-trivial software has to be significantly modified to run within the constraints of a divergent API surface.

In short, existing in-browser OS options, whether connected to a wide area network or not, fail to provide parity with what local environments and remote cloud-service environments provide. To address these shortcomings, the present description (i.e., the teaching of this disclosure) provides several device, method, and system embodiments that enable a web browser engine to locally execute runtime software such as Node.js software, Python, Ruby, PHP, Deno, and others. This is in contrast to traditional client-server architecture where a web browser running on a local computing device is communicatively coupled, via a computing network such as the internet, to a remote computing server that implements a server-side runtime environment.

In addition, the present inventors have also recognized that in many cases of real-world technology implementation, people use their computing devices to interact with other computers, electronic devices, machines, and the like. In some cases, these interactions are limited by communications infrastructure shortcomings and for other reasons. For example, a user may want to perform computing operations commensurate to conventional client-server operations in remote locations, network congested locations, network-absent locations, and the like. In these environments, network communications may be slow, intermittent, temporarily non-existent, or even permanently non-existent (e.g., in a heavily crowded environment, in a valley, in the deep woods, underwater, in open ocean, at high altitude, in deep space, in a war zone, in an area controlled by an oppressive regime, in a ship's inner confines, in an airplane, in a factory, during or after a severe weather event (e.g., storm, hurricane, flood, tsunami, earthquake, and the like), after a natural or man-made disaster, or in any other such environment).

Figure 3:
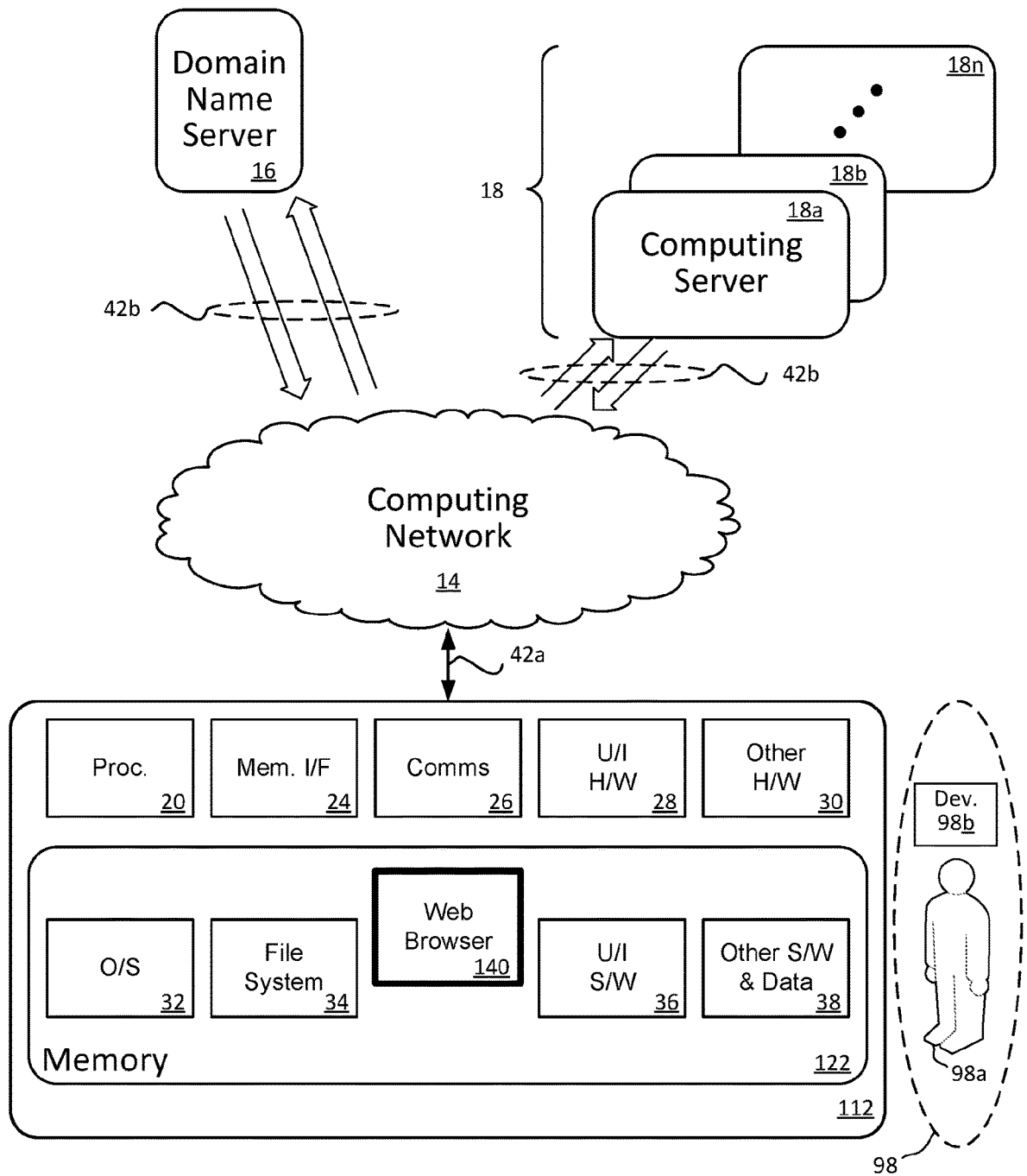
FIG. 3 is a block diagram illustrating an improved approach to network-style computing

FIG. 3 is a block diagram illustrating an improved approach to network-style computing. The architecture of FIG. 3 is not prior art, but this architecture does resemble the architecture of FIG. 1. Along these lines, some elements of FIG. 3 (e.g., user 98, processor 20, operating system 32, user interface software 36, and others) are formed like, or substantially similar to, corresponding elements of FIG. 1, and these elements, which have the same reference number, are not discussed further. Rather, by describing the distinctions between the architectures of FIGS. 1 and 3, those of skill in the technologic field will recognize that the local computing device 112 is a new and improved, specialized, and non-generic computing system that includes memory 122 loaded with improved web browser 140 software, which, when executed by a suitable processor, forms a dynamic system having features heretofore unknown in the art.

Figure 2:
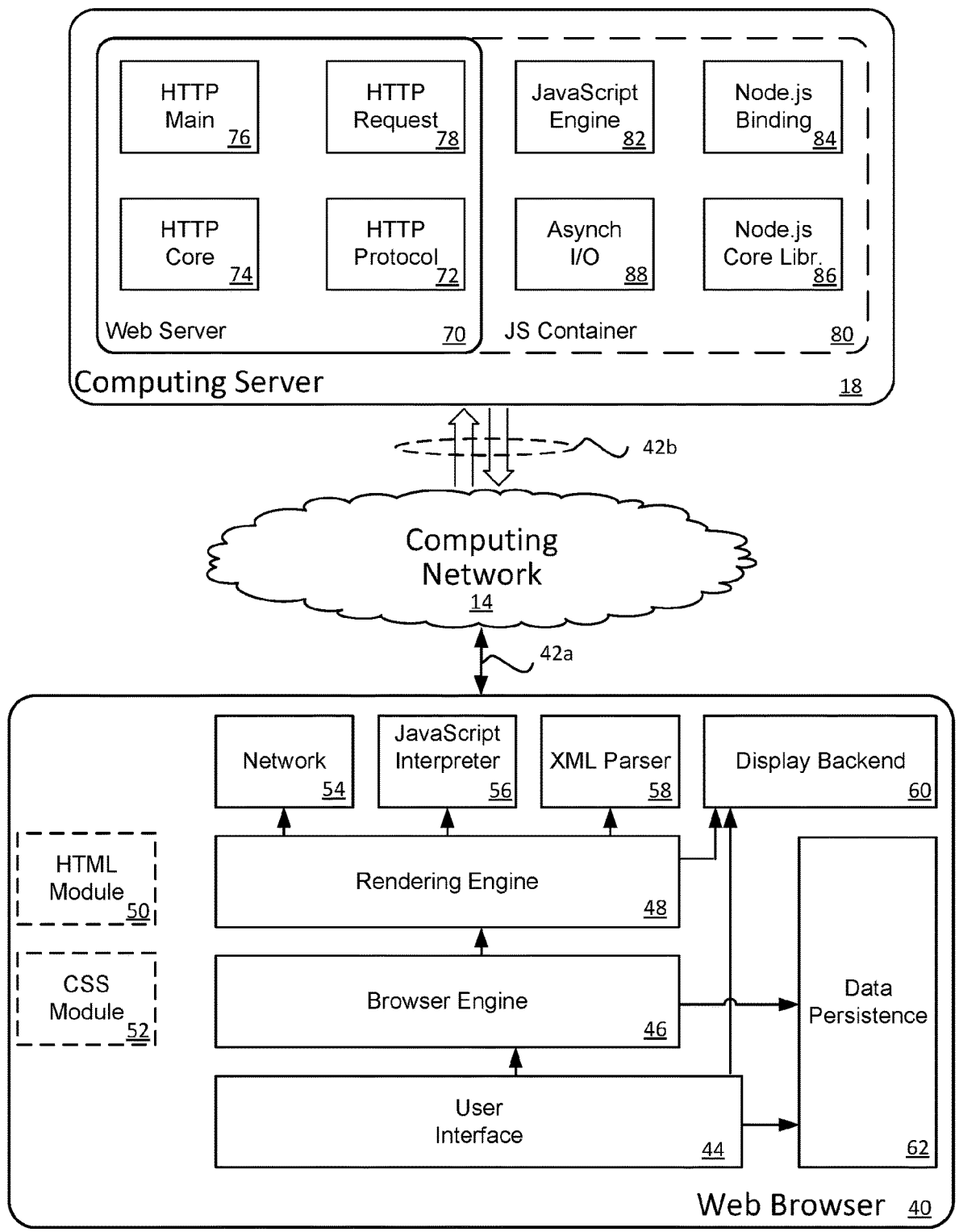
FIG. 2 is a block diagram illustrating the architecture of the conventional web browser of FIG. 1 in communication with the architecture of a conventional web server.
Figure 4:
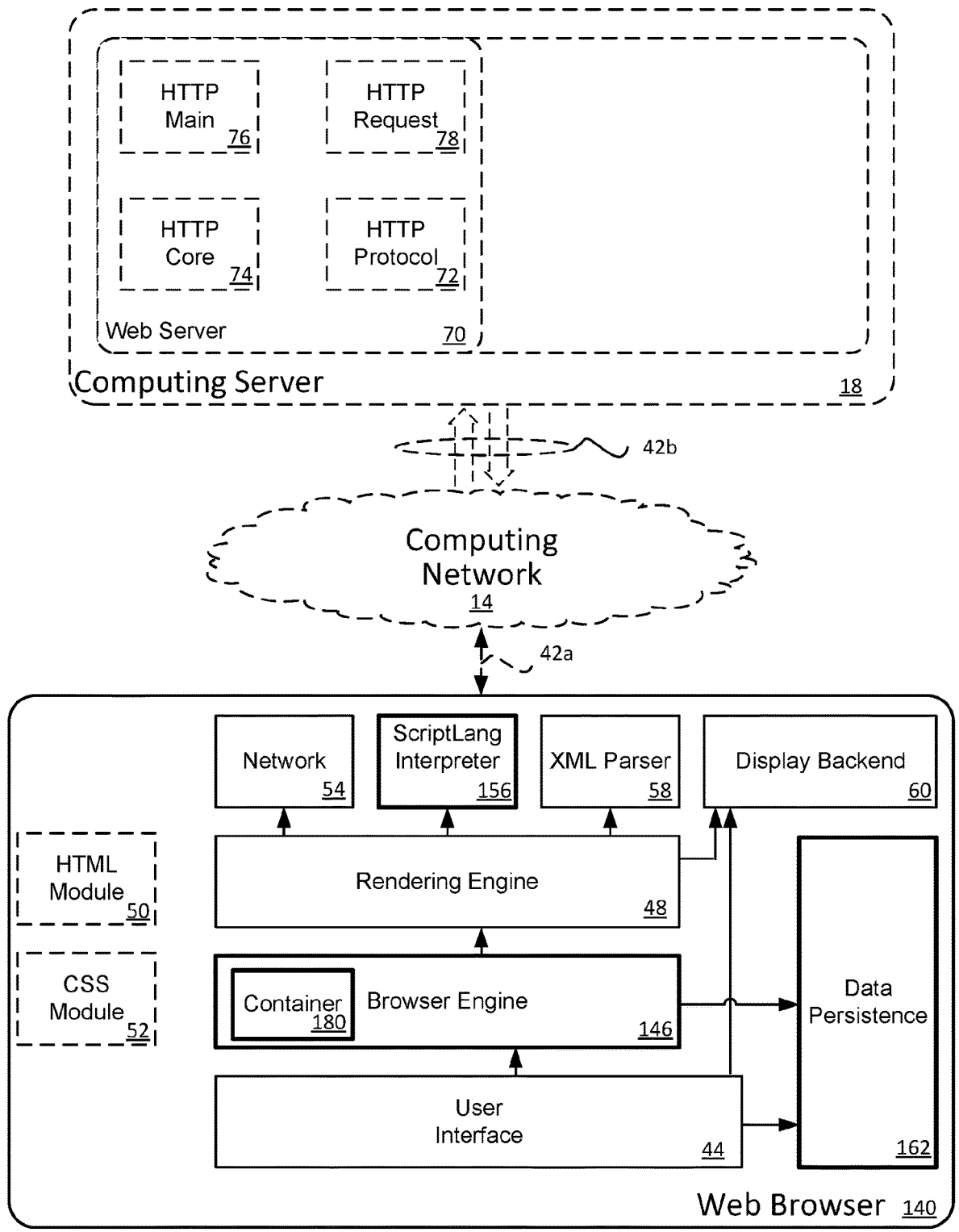
FIG. 4 is a block diagram illustrating a browser architecture with an improved web browser architecture.

FIG. 4 is a block diagram illustrating the improved web browser 140 architecture of FIG. 3 in more detail. The architecture of FIG. 4 resembles the architecture of FIG. 2, and along these lines, some elements of FIG. 4 (e.g., networking module 54, XML parser 58, display backend 60, and others) are formed like, or substantially similar to, corresponding elements of FIG. 2. These same or similar elements, which have the same reference number, are not discussed further. Rather, by describing the distinctions between the architectures of FIGS. 2 and 4, those of skill in the technologic field will further recognize the new and improved, specialized, and non-generic computing system that includes memory loaded with improved software 122, which, when executed by a suitable processor 20, forms a dynamic system having features heretofore unknown in the art.

In FIG. 4, the conventional web browser 40 (FIG. 2) of a computing system has been modified into an improved web browser 140. The improved web browser includes an improved browser engine 146, which, when operated, instantiates at least one runtime environment container 180. Optionally, the improved web browser 140 may also include a scripting language interpreter 156 (e.g., an improved JavaScript interpreter), and optionally, the improved web browser 140 may further, or alternatively, include an improved data persistence module 162. The improved browser engine 146, alone or in cooperation with other modules, includes new and modified, processor-executable instructions, which, when stored in memory, and additionally when executable and executed, forms a new and improved computing system having features heretofore unknown.

The improved web browser 140 of FIG. 4 may sometimes be in communication with the architecture of a conventional web server 70, and when such communications happen, they may be performed in the conventional way, but such communication is not required. Instead, rather than certain computing functions being performed on a remote web server 18 in a server-side runtime environment container 80 (FIG. 2), these operations may now be performed in a local runtime environment container 180.

As is known, a conventional web browser 40 (FIG. 2) is able to process web page resources of many types. Web page software is written in many different software languages that create resources that cooperate or otherwise co-exist. Hyper-Text Markup Language (HTML), Cascading Style Sheets (CSS), and JavaScript are examples of three different software languages used for web page programming, and other languages also exist. In at least one case, software code originally created and written in all three languages work together to create web pages. In these web pages, HTML instructions may be executed to create structure for a web page, instructions programmed in a CSS format are executed to style the HTML markup, and instructions written in JavaScript create interactivity. Where complex HTML and JavaScript-style functionality is conventionally performed in a remote server container 80 (FIG. 2), however, in the improved web browser 140, similar complex and runtime functionality can be achieved on the local computing device 112 without a need to interact with a server-side runtime environment.

In the improved web browser 140 of FIG. 4, HTML and CSS code can also be implemented with local resources, and, different from the conventional web browser 40, the improved web browser 140 can implement the JavaScript software in a local JavaScript runtime environment container 180. It is understood that in this disclosure, JavaScript is frequently described, but any other suitable dynamic programming language is also covered. Along these lines, a non-limiting and non-exhaustive list of content types that can be implemented via the local runtime environment container 180 includes JavaScript, "flash" animations, "Java applets," "plugins," and the like.

In at least some cases, a scripting language interpreter 156 (e.g., an improved JavaScript interpreter) is optionally integrated with, or otherwise available to, the improved web browser 140. The scripting language interpreter 156 may be arranged to parse JavaScript, convert or otherwise generate software calls into local Container 180 rather than a remote, server-based container, transcribe location or other information of the JavaScript for local processing, or perform other interpretation tasks.

In at least some cases, an improved data persistence repository 162 may additionally or alternatively be implemented. When optionally included, the improved data persistence repository 162 may be arranged to store server-side control information, data information, and the like while a web server is communicatively coupled to the improved web browser 140, which information may later be used when the remote server is unavailable. Additionally, or alternatively, the improved data persistence repository 162 may also be used to store control information, data information, and the like associated with the improved JavaScript interpreter, the runtime environment 180 container, or any other module of the improved web browser 140.

In operation, a user 98 (FIG. 3) interacts with the improved local computing device 112 (FIG. 3) via an improved web browser 140. Information input or otherwise directed by the user 98 enters the web browser 140 via user interface 44. The information is passed to an improved browser engine 146. Optionally, the information is additionally, or alternatively, stored in the improved data persistence repository 162. In at least some cases, information from the user 98 includes URI or URL information, which is translated by the improved browser engine 146, the scripting language interpreter 156, or some other software to identify a local computing resource instead of identifying a remote computing server 18. Such identifications may be by way of hard-coded addresses, dynamically updated addresses, link-tables, lookup functions, and the like. In this way, the data of the web page is locally generated. Such data may be processed by the rendering engine 48 with assistance, if needed, from any of the HTML module 50, CSS module 52, and XML parser 58. Multimedia data of the web page is presented to the user 98 via the display backend 60 and corresponding hardware.

Figure 5:
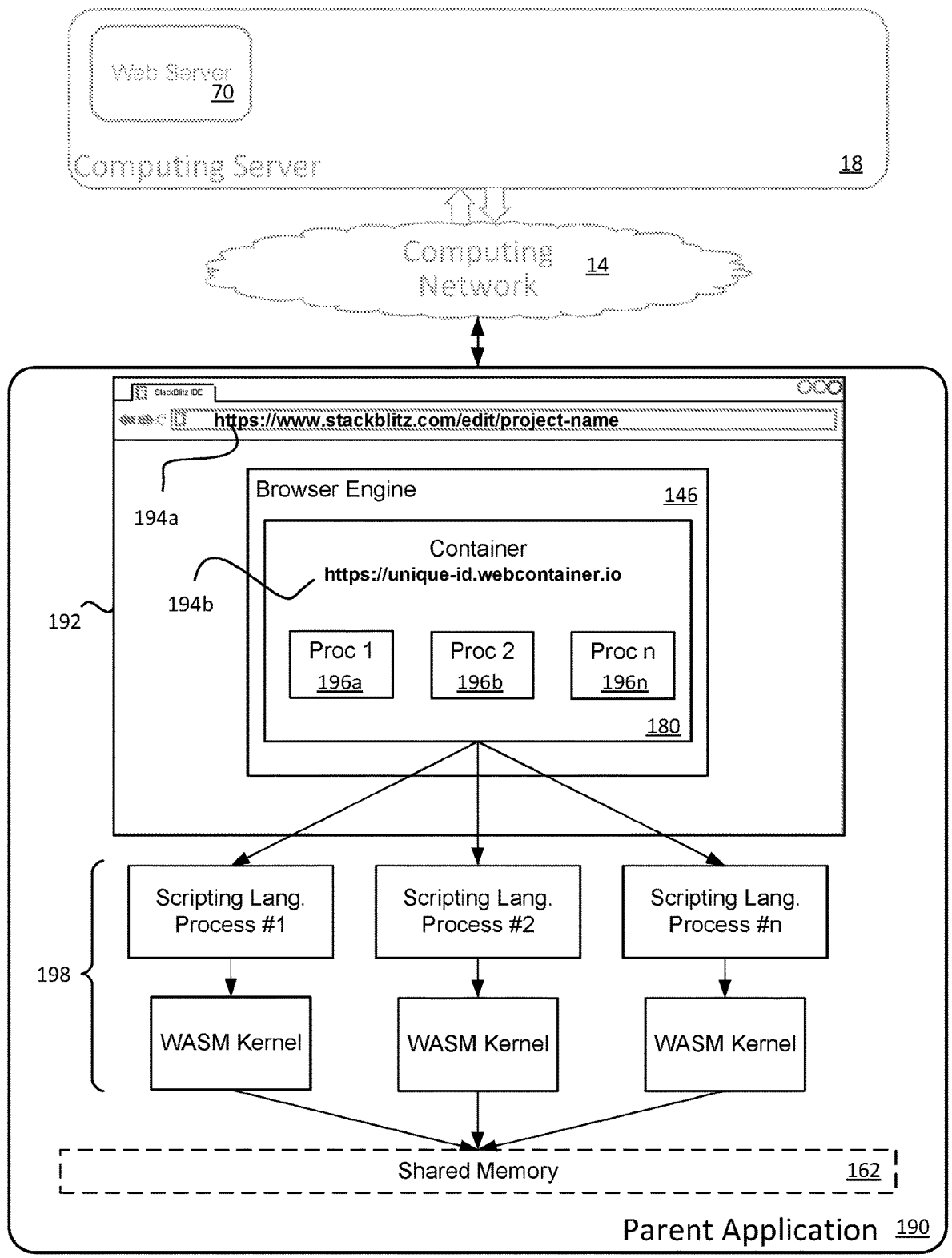
FIG. 5 is an architectural diagram of an improved browser engine.

FIG. 5 is an architectural diagram of an improved browser engine 146. A parent application 190 is running on an improved local computing device 112 (FIG. 3). The application instantiates an improved web browser 140 (FIG. 4), which opens a browser window 192. The parent application 190, via interaction with a software practitioner or other user, at least in some cases, navigates the improved web browser 140 to a particular network-accessible server resource 194a. The network-accessible server resource 194a may be accessed via uniform resource locator such as a website (e.g., HTTPS://VVWW.STACKBLITZ.COM/EDIT/PROJECT-NAME), a specific network address, or the like. The network-accessible server resource 194a may include a program, a public-facing website, a secure website, a proprietary and publicly inaccessible website, or some other resource.

Optionally, the improved web browser 140, or some module associated therewith, may include one or more qualification functions to direct access to the network-accessible server resource 194a. For example, a software variable, which may be loaded automatically or via user-control, may be tested to determine whether the improved web browser 140 will be communicatively coupled to a remote computing server 18 or instead, whether the improved web browser 140 will perform all actions locally. As another alternative, a qualification function may determine whether or not a remote computing server 18 is communicatively accessible. If the remote computing server 18 is communicatively accessible, then the improved web browser 140 will be communicatively coupled to a remote computing server 18. Alternatively, if the remote computing server 18 is not communicatively accessible (e.g., no network connection, no resolvable URL, no permission to access the resource, and the like), then the improved web browser 140 will perform all actions locally. Other types and operations of qualification functions are of course contemplated. In the embodiment of FIG. 5, the remote computing server 18, web server 70, and computing network 14 are greyed out to indicate they are inaccessible. Accordingly, in the embodiment of FIG. 5, all actions of the improved web browser 140 will be performed locally. The optional qualification function, if such is present, may be formed in the scripting language interpreter 156 (FIG. 4), browser engine 146 (FIG. 4), or some other module.

In the improved browser engine 146 of FIG. 5, at the browser node indicated by the network-accessible server resource 194a, the improved browser engine 146 instantiates at least one local runtime environment container 180. The improved browser engine 146 also instantiates a local computing server resource 194b. In the embodiment of FIG. 5, the local computing server resource 194b is accessed via uniform resource locator such as a website (e.g., HTTPS://UNIQUE-ID.WEBCONTAINER.IO). In other cases, however, the local computing server resource 194b may be accessed via a specific local memory address, a specific network address, a local circuit, a communications module, or any other suitable resource that may be accessed, directed, or otherwise controlled from the improved local computing device 112 (FIG. 3).

In addition to instantiating one or more local runtime environment containers 180 and one or more local computing server resources 194b, the improved browser engine 146 performs or otherwise directs other actions. For example, the improved browser engine 146 may further allocate certain local computing resources, including memory, to the at least one local runtime environment container 180; the improved browser engine 146 may grant access to the certain local computing resources to the local computing server resource(s) and to the at least one local runtime environment container(s); and the improved browser engine 146 may isolate the allocated certain local computing resources from other functions of the improved computing system 112. Other actions may also be directed.

At least some of the certain local computing resources (i.e., the resources whose access is granted by improved browser engine 146) are accessed from a local runtime environment container 180 via operating system application programming interface (APIs) calls. In these cases, interpretive code in or accessible by the improved browser engine 146 (e.g., using the scripting language interpreter 156 for example) recognizes such calls, and rather than directing these to resources conventionally found on a web server 18, these calls are locally directed to resources on or available to the improved computing system 112.

One exemplary and non-exhaustive list of local computing resource functions includes file system operations (e.g., read, write, create, delete, and the like), shell scripting operations, synchronous multithreading operations, server operations (e.g., starting, pausing, resetting, stopping, and the like of transmission control protocol (TCP) servers, hypertext transfer protocol (HTTP) servers, and other servers), security operations (transport layer security (TLS), secure socket layer (SSL), and the like), encryption/decryption operations, machine learning operations, image recognition operations, virtual/augmented reality operations, and the like. Any one or more of these operations may be useful in industrial applications, military applications, commercial applications, educational applications, or any other environment.

Memory is another local computing resource allocated from the improved data persistence repository 162 (FIG. 4) to the at least one local runtime environment container 180. The memory may be random access memory (RAM), read only memory (ROM), external memory (e.g., a hard drive, a flash drive, an optical storage medium, and the like). The memory may be contiguous or non-contiguous. In at least some cases, memory is allocated when needed, deallocated when no longer needed, and otherwise dynamically available.

Other local computing resources whose access is optionally granted by improved browser engine 146 include, without limitation or exhaustion, user interface resources, processing resources, interrupts, and data communication bandwidth. Other resources are also contemplated.

To prevent or at least reduce the likelihood of operations from one container mistakenly or maliciously impacting the functioning of another container or some other part of the improved computing system 112, each runtime environment container 180 is formed as a secure container (e.g., a sandbox, web security sandbox, quarantine space, a "Node.js container," and the like). In at least some cases, the secure container is formed as an iFrame within a frame. In at least some cases, such iFrame is formed as a component of the first network-accessible server resource 194a in the browser window 192 (e.g., an HTML element).

In operation, the improved browser engine 146 embodiment of FIG. 5 can include an interface that permits the parent application 190 (e.g., an integrated development environment (IDE), a programmed software application, an industrial machine, a consumer device, a kiosk, or the user or computer interface of any other useful application) to communicate with the runtime environment container 180. In at least some cases, for example, the parent application 190 uses postMessage commands to control any number of operations of the resources available within the runtime environment container 180. Other such communication and window control functions are contemplated. Upon receiving such communications, the resources available within the runtime environment container 180 in at least some cases instantiate runtime environment processes (e.g., Node.js processes), which can be arranged as "web workers" that load in the core process of the runtime environment container 180. In this way, even third-party runtime software code can be loaded and executed within a given web worker process on the improved computing system 112.

In the embodiment of FIG. 5, three local runtime environment web worker processes 196a, 196b, 196n are instantiated. Any other number of web worker processes may be instantiated in other embodiments. Each of the local runtime environment web worker processes 196a, 196b, 196n may be collectively, selectively, or individually controlled from the parent application 190 via the communications interface. Along these lines, each local runtime environment web worker process may be optionally arranged to direct the operations of certain kernel level functions. These kernel level functions may include file system functions, spawned threads, access to hardware (e.g., interrupts, general purpose input/output (GPIO), and the like), access to local wired or wireless communications functions (e.g., BLUETOOTH, USB, FIREWIRE, RS-232, RS-485, Ethernet, and the like), and other such functions.

In the embodiment of FIG. 5, a kernel-level interface 198 is arranged to direct operations of any one or more of the kernel-level functions. In such implementation, each web worker process 196a, 196b, 196n has access to a scripting language interpreter, a WebAssembly kernel module, and shared memory. The kernel-level interface 198 modules may be implemented in the improved browser engine 146, the local runtime environment container 180, the scripting language interpreter 156, or any other suitable module. The kernel-level interface 198 modules may include security features (e.g., encryption, hash functions such as keys, cyclic redundancy check (CRC) codes, challenge functions (e.g., username and password), or other security means. In at least some embodiments, the shared memory functions may be implemented by the improved data persistence module 162 (FIG. 4). For example, a SharedArrayBuffer may be implemented to schedule synchronous tasks.

Figure 6:
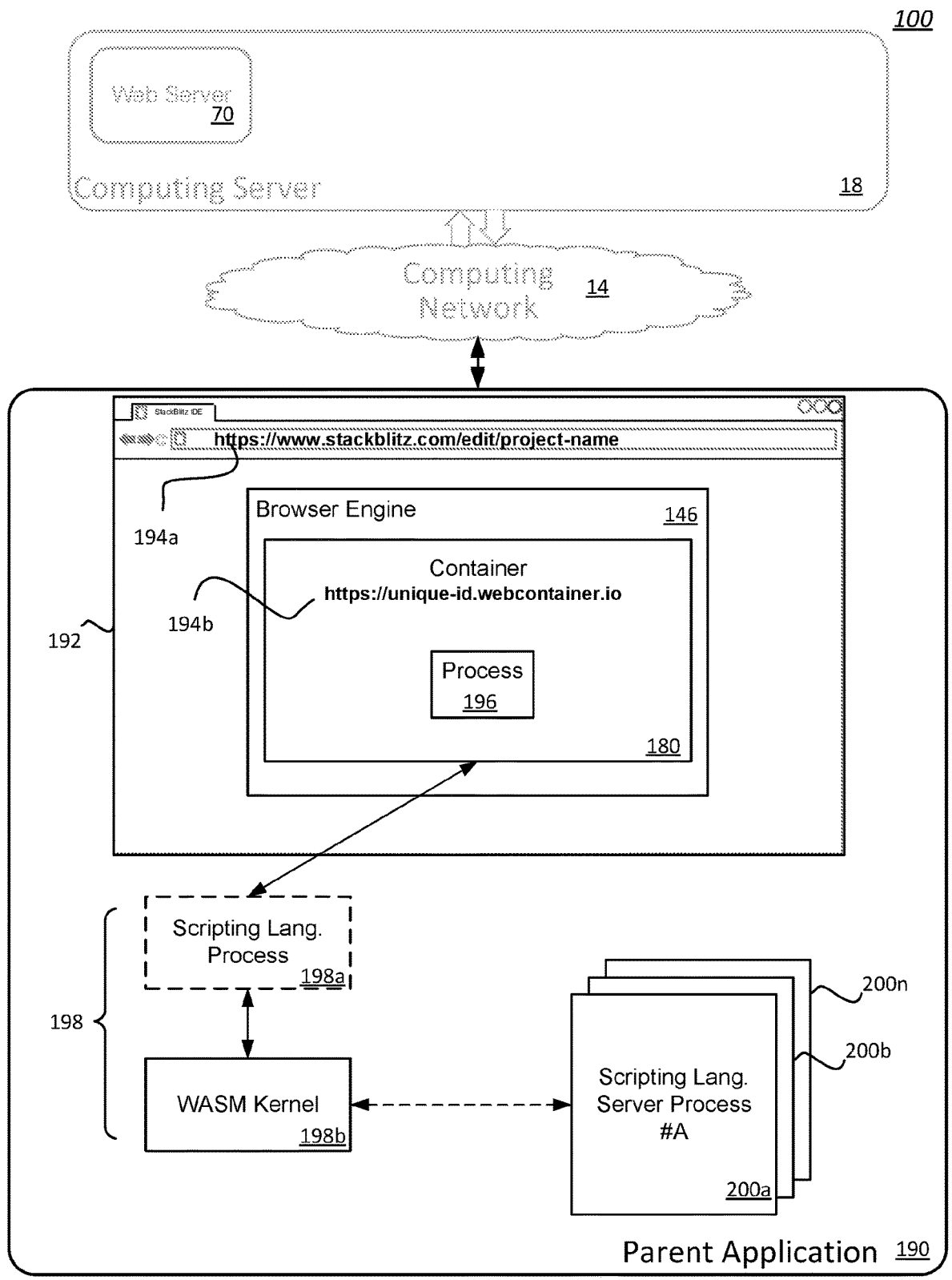
FIG. 6 is another architectural diagram of the improved browser engine.

FIG. 6 is another architectural diagram of the improved browser engine 146. The architecture of FIG. 6 includes the architectural elements of FIG. 5, and along these lines, at least some elements of FIG. 6 (e.g., browser window 192, network accessible server resource 194a, local computing server resource 194b, and others) are not discussed further.

The embodiment of FIG. 6 presents at least one use-case of a local runtime environment web worker process 196 directing the instantiation and control of any suitable number of local computing server resources. Node.js, for example, can be used to direct the instantiation and control of one or more HTTP servers. Conventional web browsers do not provide APIs to perform such actions, but as taught herein, an improved browser engine 146, via a local runtime environment web worker process 196, can invoke such processes using known API calls passed through the kernel-level interface 198. In a conventional web browser, a web worker process is stateless and prohibited from accessing resources outside of its allocated browser space, but in the embodiments described herein, the local runtime environment web worker process 196 can access such cross-origin resources via the kernel-level interface 198.

The kernel-level interface 198 of FIG. 6 includes a relay mechanism 198a and a kernel 198b. In at least one case, the relay mechanism 198a is arranged as a windowless module (e.g., an invisible iFrame). In at least one case, the kernel 198b is arranged as a WebAssembly program. The kernel 198b may be formed as a state machine, a task loop, a micro operating system, or the like. The kernel 198b has elevated privileges, which permit the kernel 198b to access and direct control over particular resources of the improved computing system 112 (FIG. 3). Such resources may include certain memory, communications modules, interrupts, timers, and the like.

In operation, the parent application 190 can make direct processes calls through the runtime environment container 180. Received communications are handled by a local runtime environment web worker process 196 (e.g., Node.js process). Depending on the content of the communications, which may be any available control information or data associated with a user 98 (FIG. 3), certain messages may be bidirectionally passed through the kernel-level interface. In at least one case, messages from the runtime environment container 180 are formatted through local computing server resource 194b (e.g., HTTPS://UNIQUE-ID.WEBCONTAINER.IO), passed to the relay mechanism 198a (e.g., PROJECT-NAME.STACKBLITX.IO/ . . . RELAY.HTML), and bidirectionally passed between the kernel 198b (PROJECT-NAME.STACKBLITZ.IO/SW.JS) and a scripting language server process 200a (e.g., PROJECT-NAME.STACKBLITZ.IO/INDEX.HTML).

Figure 7A:
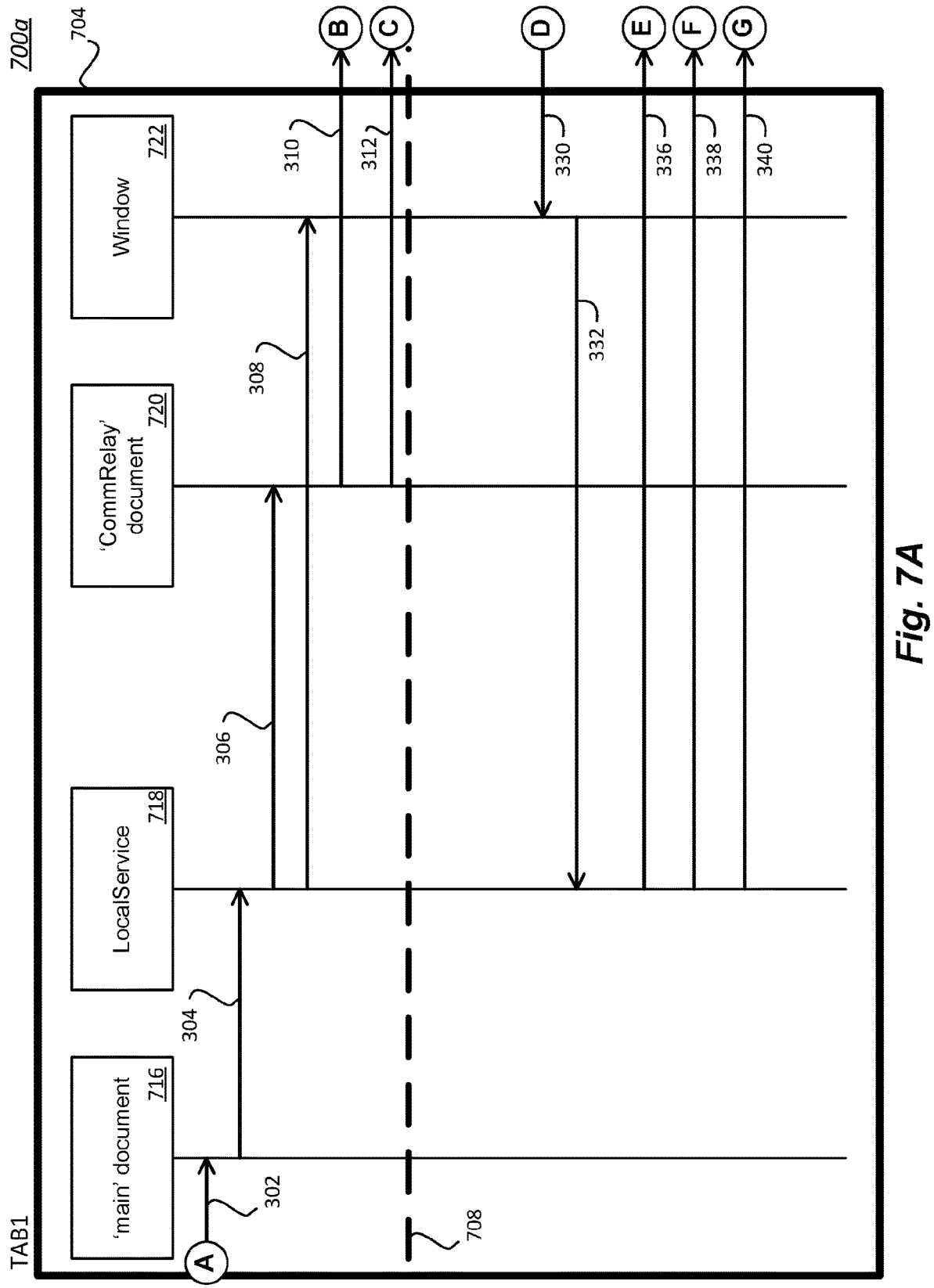
FIGS. 7A-7B are a first data flow diagram exemplifying operations of an improved browser engine.
Figure 7B:
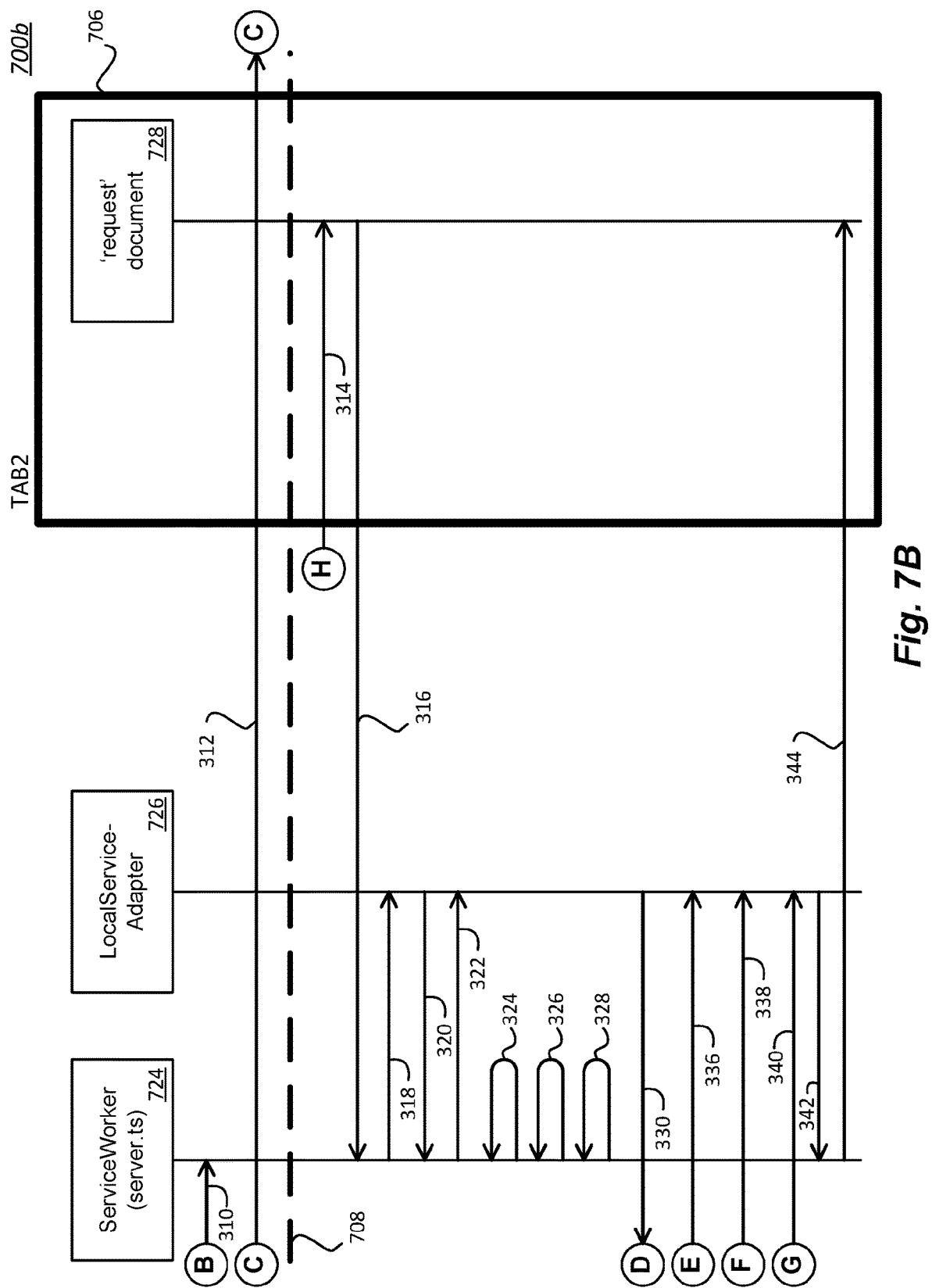

FIGS. 7A-7B are a first data flow diagram 700a, 700b exemplifying operations of an improved browser engine 146. In the present disclosure, FIGS. 7A-7B may be collectively referred to as FIG. 7. Structures earlier identified are not repeated for brevity. The embodiment of FIG. 6 is further described with reference to structures of FIGS. 3-6.

In the embodiment of FIG. 7, various local computing resources are instantiated and accessed with bidirectional communications. In this non-limiting embodiment, TCP networking is achieved by mapping TCP calls to HTTP request/response objects that the improved browser engine 146 uses to direct operations in a local runtime environment web worker process 196. The web socket API of a conventional browser engine is overridden by the improved browser engine 146 processes (e.g., scripting language interpreter 156), which permit direct communication with one or more locally instantiated scripting language server processes 200a, 200b, 200n (e.g., TCP servers). Succinctly, the embodiment of FIG. 7 teaches a virtualized TCP network stack that can instantiate and communicate with a local HTTP server and web sockets from within an improved web browser 140 and without reliance on a remote computing server.

In FIG. 7A, a first visible frame 704 is formed as a first tab in an improved web browser 140. This first visible frame 704 may, for example, correspond to browser window 192 (FIGS. 5, 6). A 'main' document 716 is associated with the first visible frame 704. In FIG. 7B, a second visible window 706 is formed as a second tab in the improved web browser 140. A 'request' document 728 is associated with the second visible window 706. Once in operation, cross-domain communications occur between the two window documents (i.e., 'main' document 716 and 'request' document 728), each associated with a different domain.

Initialization operations that instantiate the virtualized TCP network stack are represented in FIG. 7 above an initialization phase line 708 (i.e., bold, dashed line). Certain "use" operations that are implemented via messages communicated through the virtualized TCP network stack are represented in FIG. 7 below the initialization phase line 708.

Processing begins at circle-A with a first message 302 passed from a certain browser node.

In at least some cases, the first message 302 is a GET LOCALHOST:3002 message implemented in software of the improved browser engine 146.

This action may begin with a user entering a keyboard command, mouse command, motion command, automated computer command, or some other locally received command associated with a "main document" window of the browser node. This action is taken, for example, to begin a process that will allow messages to be passed through a TCP server. Starting the TCP server will also trigger the improved browser engine 146 to instantiate one or more locally hosted HTTP servers, web socket servers, and other such servers (e.g., LocalServiceAdapter 726) as described in the present disclosure.

As a next step, it is desired to instantiate a relay mechanism 198a, such as an iFrame, to permit communications from a first network accessible server resource 194a (e.g., a first domain, a main browser window, TAB1, first visible window 704) to a second local computing server resource 194b (e.g., a second domain, a second browser window, TAB2, second visible window 706, LocalServiceAdapter 726). Communications between the first network accessible server resource 194a and the second local computing server resource 194b may be considered "cross-origin" communications, "cross-domain" communications, "across-origin" communications, "across-domain" communications, "cross-border" communications, "cross-boundary" communications, or the like. Conventionally, these communications would be passed between a local computing device 12 and a remote computing server 18. In the non-limiting embodiment described in FIG. 7, these communications are passed in the improved web browser 140 on the same improved local computing device 112.

Instantiation of the relay mechanism (e.g., an iFrame) and the second local computing server resource 194b is implemented in FIG. 7A by a second message 304, a third message 306, a fourth message 308, and a fifth message 310. The relay mechanism will be used by the web page of the first tab (TAB1) to communicate with the web page of the second tab (TAB2).

In at least some cases, the second message 304 is a LOCALSERVICE.START( . . . ) message implemented in software of the improved browser engine 146 and communicated to a LocalService 718 started by the operating system of the improved local computing device 112 at the request of the improved browser engine 146. The LocalService 718 is, in at least some cases, an account or manager arranged to manage local network-accessible services.

The third message 306 includes a single message call function or a set of instructions implemented in software of the improved browser engine 146 to add a CommRelay' document 720 (e.g., an iFrame) for the local server (e.g., HTTP, web socket, or other) that is being instantiated. In at least one case, a local web server (e.g., LocalServiceAdapter 726) being instantiated will be associated with a specific URL (e.g., TESTING.LOCAL.STACKBLITZ.IO). Subsequently, when a request is made to this URL (e.g., TESTING.LOCAL.STACKBLITZ.IO), the request will be forwarded to a local server process running in the first tab, which will be retrieved by the web page of the second tab (TAB2).

In at least some cases, the fourth message 308 is a WINDOW.ADDEVENTLISTENER message implemented in software of the improved browser engine 146 and communicated to the Window 722 of the relay mechanism 198a (i.e., the CommRelay' document 720, the iFrame, or the like). This message starts an autonomous service that operates to "listen" for messages and pass them toward their appointed destination through a ServiceWorker 724 on the Window 722 of the relay mechanism 198a (i.e., the CommRelay' document 720, the iFrame, or the like) and the local web server (e.g., LocalServiceAdapter 726). In some cases, the LocalServiceAdapter 726 is implemented using, for example, local web server software installed on port 3002, as requested by the first message 302.

The fifth message 310 includes a single message call function or a set of instructions implemented in software of the improved browser engine 146 to install the ServiceWorker 724 on the server at the specific URL (e.g., TESTING.LOCAL.STACKBLITZ.IO). When a request is made to this specific URL, the request is forwarded to the LOCALHOST.

Summarizing the acts performed above the initialization phase line 708, a first message 302, which comes, for example, from a TCP server (FIG. 8) operating on a first local domain, tries to connect to a port, which causes the improved browsing engine 146 to start a process to instantiate a relay mechanism and a local web server listener on a second local domain. An iFrame 720 is initialized, and once the iFrame 720 loads, the iFrame 720 installs ServiceWorker 724 on Window 722 of iFrame 720. After the ServiceWorker 724 is installed, the local server is ready to begin receiving requests (e.g., HTTP requests, web socket requests, or other local server requests), and the local server waits until they are received. Upon starting, the local server can be accessed in a browser via, for example, the browser's second visible window 706 (e.g., the second domain, TAB2).

Message 312, the sixth message, represents initialization information passed from the iFrame 720, through the local web server (e.g., LocalServiceAdapter 726) and to the web page of the second tab (TAB2) toward a user 98.

Considering acts below the initialization phase line 708, a seventh message 314 is associated with the second visible window 706 (TAB2), which was started as a result of interaction with the local server instantiated via messages 302-312. In at least some cases, the seventh message 314 is a GET TESTING.LOCAL.STACKBLITZ.IO message implemented in software of the improved browser engine 146.

In response to the seventh message 314 (i.e., the GET request), an eighth message 316 fetch request (e.g., an HTTP fetch request, initWebSocket( ) request, or the like) is communicated to the ServiceWorker 724 to begin exercising the local web server (e.g., LocalServiceAdapter 726, LOCAL.STACKBLITZ.IO).

Upon receipt of the eighth message 316, the ServiceWorker 724 executes particular inquiry software and initiates various communications to determine whether or not the ServiceWorker 724 is connected to a relay mechanism 198a (FIG. 6) (i.e., the CommRelay' document 720, the iFrame, or the like) that is attached to the local web server (e.g., LocalServiceAdapter 726, LOCAL.STACK-BLITZ.IO) and sitting on the domain of the TCP server (FIG. 8). Such interrogation, which is conducted in this embodiment via the ninth to fourteenth messages 318-328, is further arranged to determine if the main window (e.g., 'main' document, first visible window 704, TAB1) is associated with a local server such as a TCP server (FIG. 8) that is arranged to receive the fetch request.

In at least some cases, the ninth message 318 is a CONTROLLERCONNECTED( ): BOOLEAN message implemented in software of the improved browser engine 146 and passed from the ServiceWorker 724 to the local web server (e.g., LocalServiceAdapter 726). Such message is arranged to poll the local web server and received an affirmative or contradictory (e.g., yes or no, 1 or 0, true or false, and the like) response.

In at least some cases, the tenth message 320 is a PROMISE<BOOLEAN> message implemented in software of the improved browser engine 146 and returned from the local web server (e.g., LocalServiceAdapter 726) to the ServiceWorker 724. Such message is the response to polling request from the ServiceWorker 724.

In at least some cases, the eleventh message 322 is a CONTROLLERFETCH( ) message implemented in software of the improved browser engine 146 and passed from the ServiceWorker 724 to the local web server (e.g., LocalServiceAdapter 726).

In at least some cases, the twelfth message 324 is a SELF.CLIENTS.MATCHALL message implemented in software of the improved browser engine 146 and arranged to clearly capture server identification information.

In at least some cases, the thirteenth message 326 is a NEW MESSAGECHANNEL message implemented in software of the improved browser engine 146 and arranged to begin creation of a new message channel for sending outbound messages from the local web server (e.g., LocalServiceAdapter 726).

And in at least some cases, the fourteenth message 328 is a PORT1.ONMESSAGE message implemented in software of the improved browser engine 146 and arranged to set up a message event handler that will receive messages from the TCP server.

Upon establishing that there is a TCP server (FIG. 8) accessible through the ServiceWorker 724, the ServiceWorker 724 formats the fetch request associated with the eighth message 316 toward the TCP server via the fifteenth and sixteen messages 320, 332.

In at least some cases, the fifteenth message 330 is a CLIENT.POSTMESSAGE(MESSAGE, [PORT2]) message implemented in software of the improved browser engine 146 and sent from the local web server (e.g., LocalServiceAdapter 726), via the ServiceWorker 724, to the iFrame 720 (i.e., the CommRelay' document) of Window 722.

In at least some cases, the sixteenth message 332 is a 'MESSAGE' LISTENER FIRED message implemented in software of the improved browser engine 146 and arranged to pass the information from the iFrame 720 of Window 722 to the TCP server (FIG. 8) using the account credentials of the LocalService 718 associated with the 'main' document 716 of the TCP server (FIG. 8). The fifteenth message 330 and sixteenth message 332 will include the contents of the original fetch request (i.e., eighth message 316), which includes a port on the local web server (e.g., LocalServiceAdapter 726) that enables the TCP server to return a response.

The response from the TCP server (FIG. 8) includes several messages, including the seventeenth message 336, eighteenth message 338, and nineteenth message 340, which are passed back through the 'main' document 716 of the first visible window 704 (TAB1), the local service 718, and the relay mechanism 198a (FIG. 6)(e.g., 'CommRelay' document 720, Window 722, ServiceWorker 724) of the local web server (e.g., LocalServiceAdapter 726).

In at least some cases, the seventeenth message 336 is a PORT2.POSTMESSAGE(SEND_RESPONSE) message implemented in software of the improved browser engine 146 that opens the cross-origin communications from the TCP server (FIG. 8) back to the local web server (e.g., LocalServiceAdapter 726).

In at least some cases, the eighteenth message 338 is a PORT2.POSTMESSAGE(STREAM_PUMP) message implemented in software of the improved browser engine 146.

In at least some cases, the nineteenth message 340 is a PORT2.POSTMESSAGE(STREAM_END) message implemented in software of the improved browser engine 146.

The messages from the TCP server (FIG. 8) (e.g., the seventeenth to nineteenth messages 336-340) are passed as the twentieth message 342 and twenty-first message 344 through the ServiceWorker 724) of the local web server (e.g., LocalServiceAdapter 726) to the 'request' document 728 associated with the second visible window 706 of the user's improved web browser 140.

In at least some cases, the twentieth message 342 is a PROMISE<RESPONSE> message implemented in software of the improved browser engine 146 passed from the local web server (e.g., LocalServiceAdapter 726) to the ServiceWorker 724.

In at least some cases, the twenty-first message 344 is a RETURN RESPONSE message implemented in software of the improved browser engine 146 and from the ServiceWorker 724 to the second visible window 706 (TAB2) of the user's improved web browser 140.

Summarizing the acts performed below the initialization phase line 708, a request comes in on the second local domain (e.g., seventh message 314), that is handled by the ServiceWorker 724 (e.g., eighth message 316). A sequence of processing and communications (e.g., ninth to fourteenth messages 318 to 328) checks 'Comm relay' document 720 to establish whether a TCP server has been started on the first local domain. Such checking may, for example be performed by verifying whether or not the 'Comm relay' document 720 is a connected page to the ServiceWorker 724. If so, the second local domain is connected to the iFrame 720 using a postMessage (e.g., fifteenth and sixteenth messages 330 to 332) with a request and a mechanism (e.g., a port number) for the TCP server on the first local domain to send responses directly back through the Service-Worker 724 and to the user's improved web browser 140 second visible window 706 (TAB2), seventeenth to twenty-first messages 336 to 344.

Figure 8A:
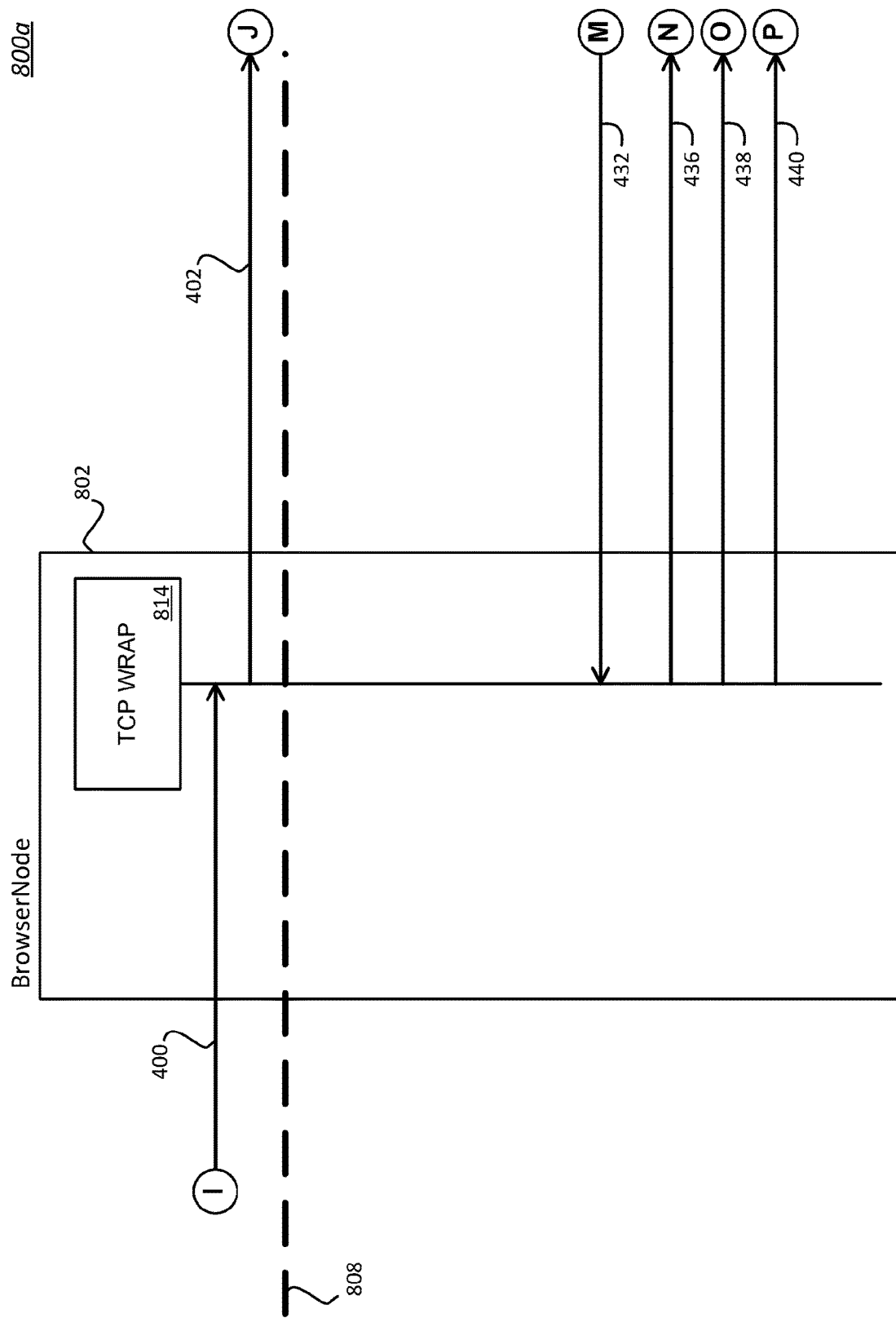
FIGS. 8A-8C are second data flow diagram exemplifying operations of an improved browser engine.
Figure 8B:
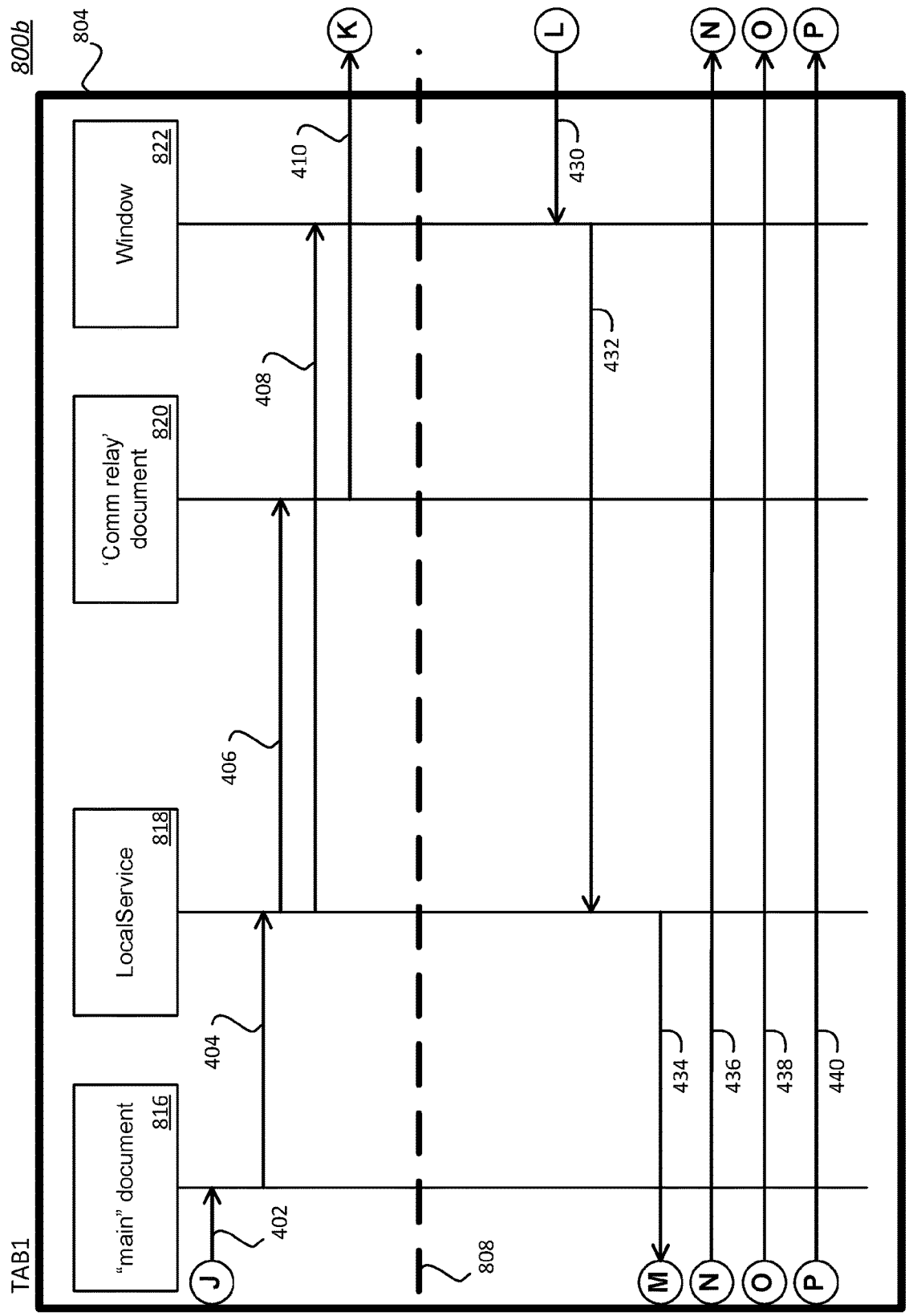
Figure 8C:
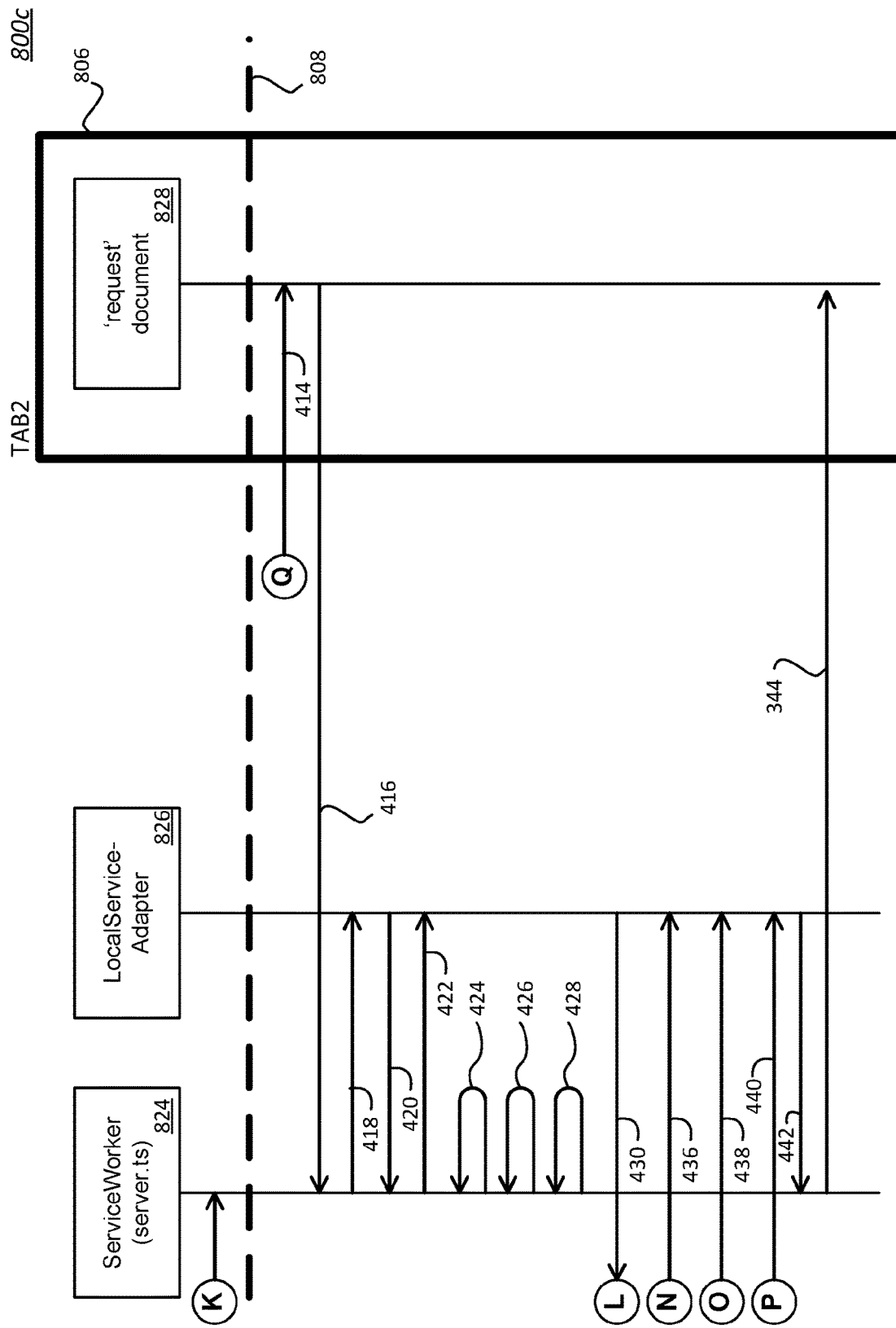

FIGS. 8A-8C are second data flow diagram 800a, 800b, 800c further exemplifying operations of an improved browser engine 146. In the present disclosure, FIGS. 8A-8C may be collectively referred to as FIG. 8. Structures earlier identified are not repeated for brevity.

The operations of the improved browser engine 146 of FIG. 8 virtualize a TCP networking stack with HTTP and ServiceWorker support across cross-origin domains. Along the lines of FIG. 7, however, the teaching of FIG. 8 may be applied HTTP communications, web socket communications, and other such cross-origin communications. More than the embodiment of FIG. 7, however, FIG. 8 also shows acts before the containerization of the cross-origin communications shown in FIG. 7.

In FIG. 8A, processing begins at circle-I with a server creation message 400. In at least some cases, the server creation message 400 is a CREATESERVER(TCP) message implemented in software of the improved browser engine 146 and passed into a browser node 802. The browser node 802 may be visible in a browser, visible in a software development environment, or not visible at all. The browser node 802 hosts a TCP wrapper function 814 that, in at least one embodiment, operates as a TCP server.

The TCP server of FIG. 8A embodied in the TCP wrapper function 814 may optionally provide a networking access control list (ACL) system that filters network access to internet protocol servers of the TCP server. Hence, the TCP wrapper function 814 can in some cases be used in a software development or other environment to protect network communications (e.g., cross-origin communications) from malicious or otherwise unacceptable communications.

In some cases, the TCP wrapper function 814 of the browser node 802 is further arranged to host a Node.js instance along the lines of the runtime environment container 180 (FIG. 6). By use of the TCP wrapper function 814, communications from one application may be placed in a first virtual container while communications from other applications may each be placed in respective other virtual containers. In this way, the improved browser engine 146 can host any selected number projects with a substantially reduced concern of overlap, overrun, corruption, or malicious activity. As further described herein with respect to FIG. 8, when a request is received from a local web server 826, the request is passed into the running TCP wrapper function 814 (e.g., Node.js instance), and then the response from the wrapper is communicated back out to a Service-Worker 824.

Along the lines of FIG. 7, initialization operations that instantiate a virtualized TCP network stack are represented in FIG. 8 above an initialization phase line 806 (i.e., bold, dashed line). Communications operations that exercise the virtualized TCP network stack are represented in FIG. 8 below the initialization phase line 806.

Upon creation of the TCP server and running instance of Node.js in the browser node 802, a first message 402 is formed and communicated to enable cross-origin communications between the TCP server operating on the improved local computing device 112 (FIG. 3) and a local web server (e.g., LocalServiceAdapter 826, LOCAL.STACK-BLITZ.IO) that is also operating on the improved local computing device 112.

In at least some cases, the first message 402 is a WINDOW.POSTMESSAGE(SERVER_REQUEST) message implemented in software of the improved browser engine 146. Such command may be user generated (e.g., keyboard command, mouse command, motion command, or the like), computer generated, or directed by some other command The first message 402 is received at a first visible frame 804 (e.g., a first tab) in an improved web browser 140. The first visible frame 804 may correspond to browser window 192 (FIGS. 5, 6) that is associated with the TCP server administered by the TCP wrapper function 814. A 'main' document 816 is associated with the first visible frame 804 and therefore associated with the TCP server.

In FIG. 8C, a second visible frame 806 is formed as a second tab in the improved web browser 140. A 'request' document 828 is associated with the second visible window 806. Once in operation, cross-origin communications occur between 'main' document 816 and 'request' document 828, which are associated with the TCP server (i.e., TCP wrapper function 814) and the local web server (e.g., LocalServiceAdapter 826), respectfully.

As a next step, relay mechanism 198a (FIG. 6) is instantiated as, for example, an iFrame. Instantiation of the relay mechanism (e.g., an iFrame) begins with a second message 404, a third message 406, a fourth message 408, and a fifth message 410. The relay mechanism is used by the web page of the first tab (TAB1) to communicate with the web page of the second tab (TAB2).

In at least some cases, the second message 404 is a LOCALSERVICE.START( . . . ) message implemented in software of the improved browser engine 146 and communicated to a LocalService 818 started by the operating system of the improved local computing device 112 at the request of the improved browser engine 146.

In at least some cases, the third message 406 includes a single message call function or a set of instructions implemented in software of the improved browser engine 146 to associate the iFrame (e.g., CommRelay' document 820) with the local web server that is being started. As in FIG. 7, the local web server (e.g., LocalServiceAdapter 826) can be associated with any selected URL (e.g., TESTING.LOCAL.STACKBLITZ.IO). Requests later made to this URL will be forwarded to a LOCALHOST and retrieved by the web page of the second tab (TAB2).

In at least some cases, the fourth message 408 is a WINDOW.ADDEVENTLISTENER message implemented in software of the improved browser engine 146 and communicated to the iFrame Window 822. This message causes installation of a Service Worker 824 on the iFrame Window 822 and starts the local web server (e.g., LocalServiceAdapter 826).

The fifth message 410 includes a single message call function or a set of instructions implemented in software of the improved browser engine 146 to install the service worker 824 on the server at the specific URL (e.g., TESTING.LOCAL.STACKBLITZ.IO).

Considering acts below the initialization phase line 708, a sixth message 414 is associated with the second visible window 806 (TAB2), which was started as a result of interaction with the local server instantiated via messages 402-412. In at least some cases, the sixth message 414 is a GET TESTING.LOCAL.STACKBLITZ.IO message implemented in software of the improved browser engine 146.

In response to the sixth message 414, a seventh message 416 fetch request (e.g., an HTTP fetch request, initWebSocket( ) request, or the like) is communicated to the ServiceWorker 424 to begin exercising the local web server.

Upon receipt of the seventh message 416, the ServiceWorker 824 executes particular inquiry software and initiates various communications to determine whether or not the ServiceWorker 824 is connected to the iFrame attached to the local web server and sitting on the domain of the TCP server. Such interrogation, which is conducted in this embodiment via the eighth to thirteenth messages 418-428, is further arranged to determine if the main window (e.g., 'main' document, first visible window 804, TAB1) is associated with the TCP server that will receive the fetch request.

Messages 418-428 are along the lines of messages 318-328 (FIG. 7) and are not further discussed.

Upon establishing that the TCP server is accessible through the ServiceWorker 824, the ServiceWorker 824 formats the fetch request associated with the seventh message 416 toward the TCP server via the fourteenth, fifteenth, and sixteenth messages 430, 432, 434.

In at least some cases, the fourteenth message 430 is a CLIENT.POSTMESSAGE(MESSAGE, [PORT2]) message implemented in software of the improved browser engine 146 and sent from the local web server, via the ServiceWorker 424, to the iFrame 820.

In at least some cases, the fifteenth message 432 is a 'MESSAGE' LISTENER FIRED message implemented in software of the improved browser engine 146 and arranged to pass the information from the iFrame 820 to TCP server. The LocalService 818 to the TCP server provides credentials associated with the 'main' document 816 of the TCP server.

In at least some cases, the sixteenth message 434 is formatted with the credentials from the LocalService 818 to communicate the port opened on the local web server from the original fetch request (i.e., eighth message 416) to the TCP server thereby enabling direct cross-origin communication between the TCP server and the local web server.

Upon receiving the sixteenth message 434, the TCP server formulates a response that includes several messages, including the seventeenth message 436, eighteenth message 438, and nineteenth message 440, which are passed back through the 'main' document 816 of the first visible window 804 (TAB1), the local service 818, and the relay mechanism 198*a* (FIG. 6) that includes the iFrame of the local web server (e.g., LocalServiceAdapter 826).

Messages 436-4440 are along the lines of messages 336-340 of the data flow of (FIG. 7). The seventeenth message 436 opens the direct, cross-origin communications from the TCP server through ServiceWorker 824 of the local web server where they are accessible to the second visible window 806 (TAB2) of the user's improved web browser 140.

In at least some cases, the eighteenth message 438 generates a messages pump mechanism for ongoing unidirectional or bidirectional messaging between the two servers. And the nineteenth message 440, which is optionally, temporarily or permanently closes messaging between the two servers. As understood by those of skill in the art, there may be seconds, minutes, hours, days, or any suitable time period between the eighteenth and nineteenth messages, 438, 440. In at least some cases, the nineteenth message 440 is not sent at all.

Messages 442-444 are along the lines of messages 342-344 (FIG. 7) and are not further discussed.

Further considering the features and benefits of the improved browser engine 146 architecture of FIG. 5, the present disclosure teaches an API-complete Node.js or other such runtime that can execute or otherwise control Node.js or other such applications entirely inside an improved web browser engine 180. A kernel is provided that supports synchronous and atomic filesystem operations, thread spawning and control, support to start full TCP/HTTP and other such servers locally that are accessible within an improved web browser 140, control local hardware, and perform other such functions.

In particular, the present disclosure further teaches structures and means to run local computing servers (e.g., HTTP servers) from inside of an improved web browser 140. Multiple node APIs are provided to enable broad support for third-party Node.js and other such programs. One of skill in the art will recognize that embodiments described herein permit JavaScript, WebAssembly, and other such applications, which may rely on operating system APIs typically provided in a Node.js or other such environment, to run on an improved local computing device 112 within a runtime environment container 180 (e.g., a security sandbox). Those of skill in the art will recognize that an improved web browser 140 is described herein, but other secure environments powered by improved browser engine 146 functionality (e.g., CLOUDFLARE WORKERS, NETLIFY, FIREBASE, LAMBDA, and others) is within the scope of the present disclosure.

It is desirable to run applications purely within an improved browser engine 146 for several reasons. For example, a web browser has inherent security that web browser developers are constantly improving. The teaching of the present disclosure can quickly be ported to any new web browser thereby creating an improved web browser 140 as described herein. Web browsers also serve as fast, consistent cross-platform targets that permit a third-party software practitioner to write an application once that can be instantly opened in any improved web browser 140 without additional recompilation. For at least some users of the disclosed technology, completely in-browser development environments that do not rely on remote computing servers 18 for complex compute work are now available. This is the inverse model to conventional server-based IDEs.

To implement this technology, the present inventors have recognized that executing Node.js and other like runtime environments sometimes requires access to underlying operating system APIs, and conventional web browser engines do not provide traditional operating system primitives (e.g., POSIX APIs, a shell/terminal, synchronous file system access, multithreading with synchronous operations, nor the ability to start TCP/HTTP web servers that are locally accessible). While conventional Node.js is based on the CHROMIUM V8 engine, the conventional environment diverges from CHROMIUM'S sandboxed execution model by exposing raw operating system APIs for developers to utilize. Powerful applications can be built, but this mechanism breaks the cross-platform benefits of conventional browser engines and also exposes the operating system of a local computing device to malicious exploits while code is executing.

The shortcomings of the conventional systems are now overcome. In one embodiment, for example, a kernel-level interface is used by a JavaScript/WebAssembly runtime of an improved browser engine. This architecture permits the full Node.js API set to be run from inside of a secure runtime environment container. Instead of attempting to port a full or even streamlined operating system to a web browser, the present inventors focused on the runtime environment (e.g., Node.js). Custom patches for the APIs that would normally access local, native functionality can be provided using any known scripting language. And because this type of runtime environment scripting language is already known to the web browser, these custom patches can be piggybacked into the existing web browser code thereby creating an improved web browser instead of shelling to, and exposing, native operating system functionality.

In one embodiment, a Node.js is executed inside an improved web browser by piggybacking on the improved browser engine's existing JavaScript/WebAssembly runtimes, and providing a kernel with symmetrical APIs that Node.js relies on internally. This system is enabled to execute any untrusted third-party code, even when it accesses operating system APIs, entirely within the secure execution container of the improved web browser, and without having to modify the third-party source code in any way.

Since the teaching in the present disclosure includes a system that runs all code inside a secure web browser's runtime environment container, the system can also work offline or when conventional communications infrastructure is otherwise unavailable. The web environment disclosed herein is able to spawn and control local computing servers (e.g., HTTP servers) on demand, and without ever leaving the improved web browser security sandbox. The improved browser engine is capable of synchronous processes and file locking via a kernel-level interface and shared memory (e.g., SharedArrayBuffers). Along these lines, at least some of the APIs that can be used to implement a non-limiting embodiment of the present invention are new additions to web browsers (e.g., Service Workers, SharedArrayBuffers, Atomics, WebAssembly, WebAssembly Threads, and others) and these APIs are being deployed in new ways. Service Workers, for example, were designed for the purpose of enabling offline capable web applications by introducing a simple HTTP proxy API that a web application could register. These Service Workers do not expose APIs for controlling the HTTP proxy API outside of the Service Workers own scope.

Considering at least one practical application of the embodiments described herein, the technology of the present disclosure may be used to substantially increase the productivity, time-efficiency, and cost-effectiveness of software developers. By applying the teaching herein, a software practitioner can be set up with an entire software development environment simply by directing an improved web browser 146 to navigate toward a single URL. What's more, any number of software practitioners can be set up with the exact same software development environment simply by directing the improved web browser 146 of each software practitioner toward the same URL on their respective local machine.

In conventional software development, the software practitioner is required to download or otherwise acquire certain software, install the software on their local computing device, boot the new software, and configure the environment where the software will be exercised or otherwise used. In many cases, configuring the environment would take several minutes, several hours, or even several days. Now, as taught in the present disclosure, once the environment is configured, a single uniform resource locator (URL) can be associated with the environment, and the URL can be sent to one or more software practitioners. When the software practitioner "opens" the URL in a tab or window of their improved web browser 140, the environment will download and install automatically. As a further benefit toward time-savings, efficiency, and security, since all of the resources will be provided via a secure container environment of the local computing device, the installation is network secure and nearly instantaneous.

As at least one more example, the teaching of the present disclosure may be applied to any suitable number of computing servers, web servers, and other types of remote computing devices. In this way, any type of computing environments may be massively, securely, and quickly deployed. Once an environment is created, and it can be associated with a single URL, and the single URL can be communicated (e.g., emailed, directly downloaded, file-transferred, or the like) to a desired destination. Upon receiving and navigating to the URL using an improved web browser 140 with the associated improved browser engine 146, the preloaded environment will locally self-install and self-deploy within the improved web browser's security sandbox where it can't access other memory or services of the rest of the machine. Nearly instantaneously, the remote computing device will be ready for use. One or thousands or more computing machines can be deployed with the exact same environment running the exact same code very consistently.

Figure 9A:
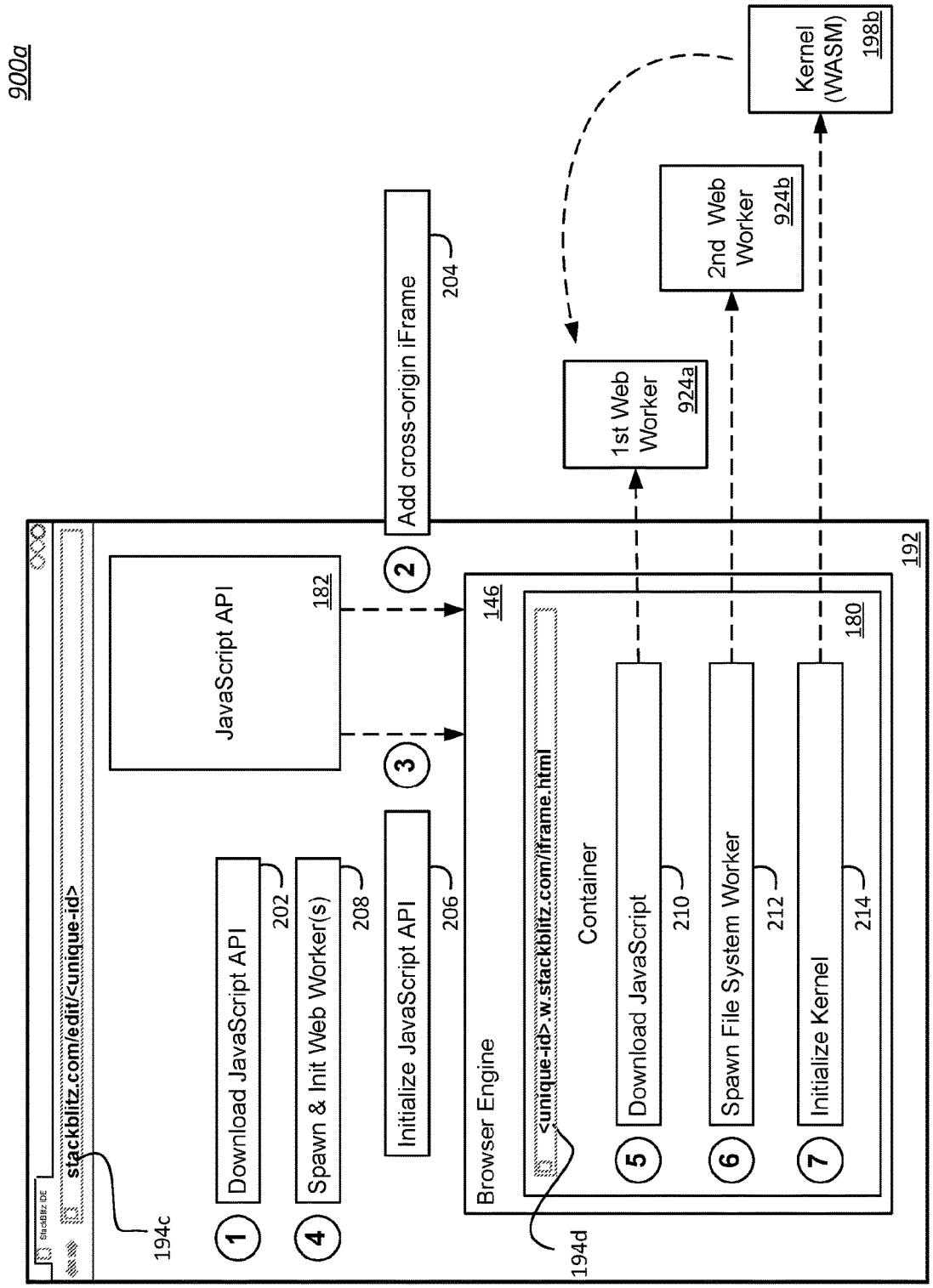
FIG. 9A is a high-level architecture of a process to bootstrap a system having cross-origin domain communications.
Figure 9B:
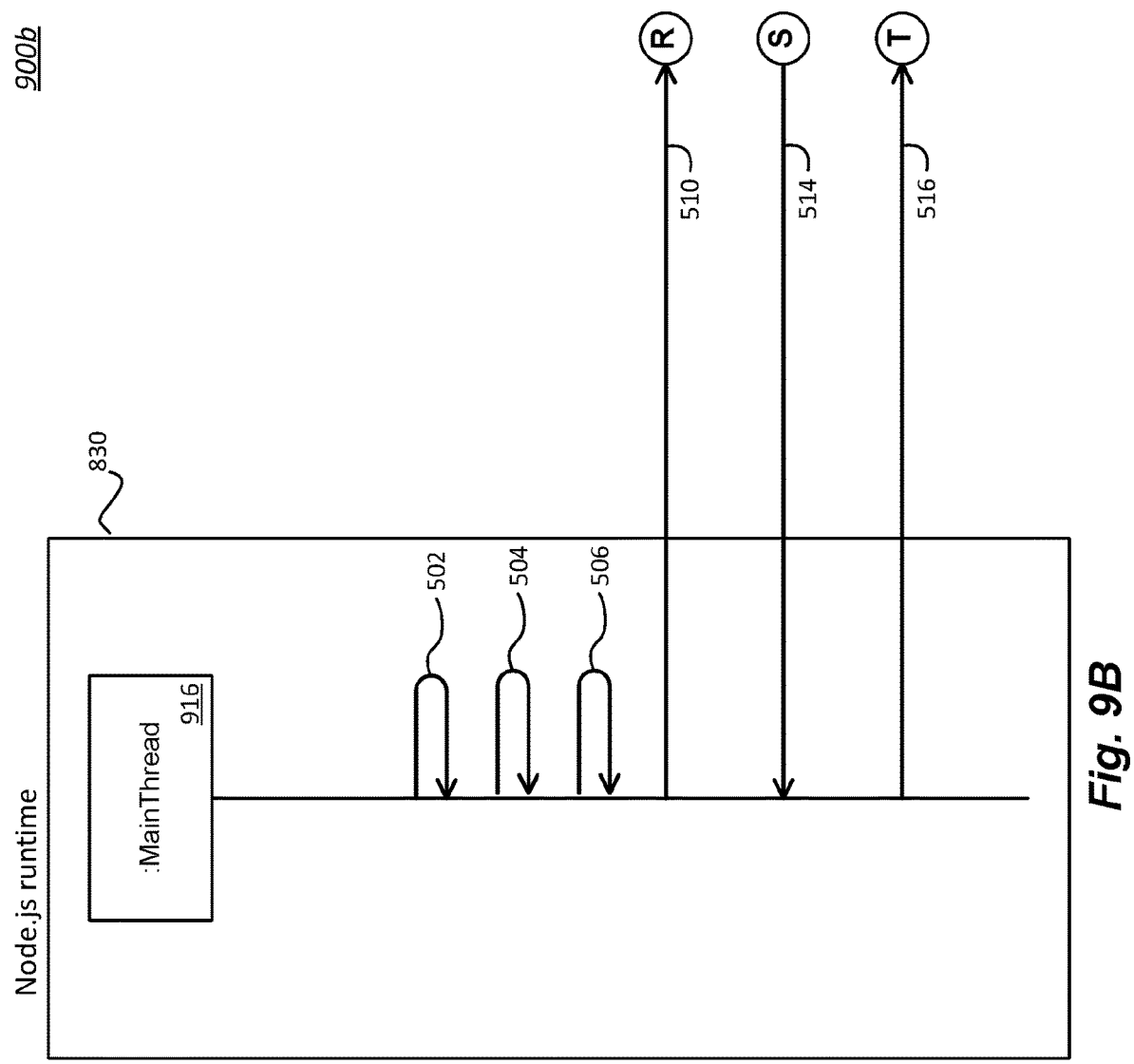
FIGS. 9B, 9C are exemplary communications carried out in the bootstrapping process of FIG. 9A.
Figure 9C:
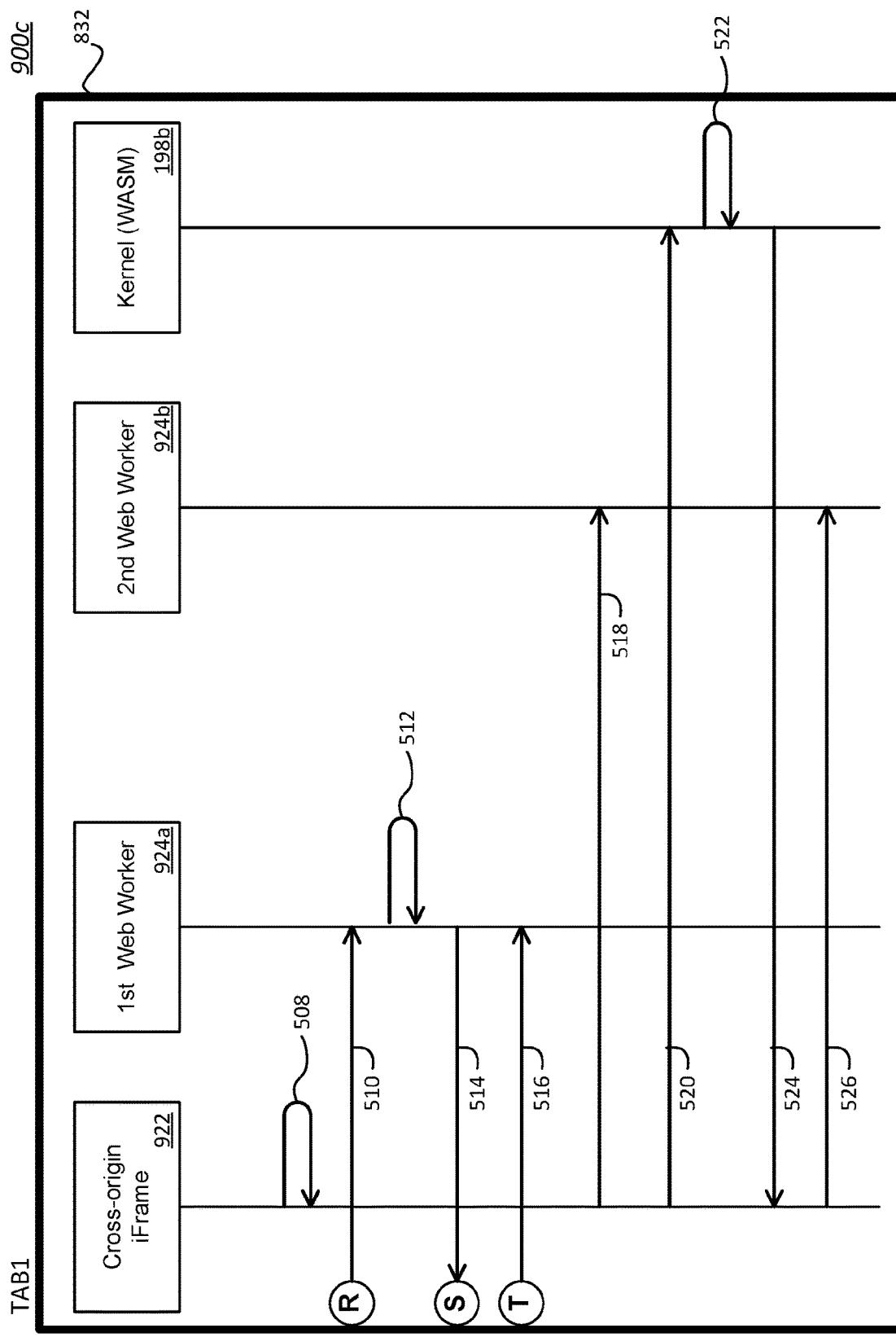
Figure 9D:
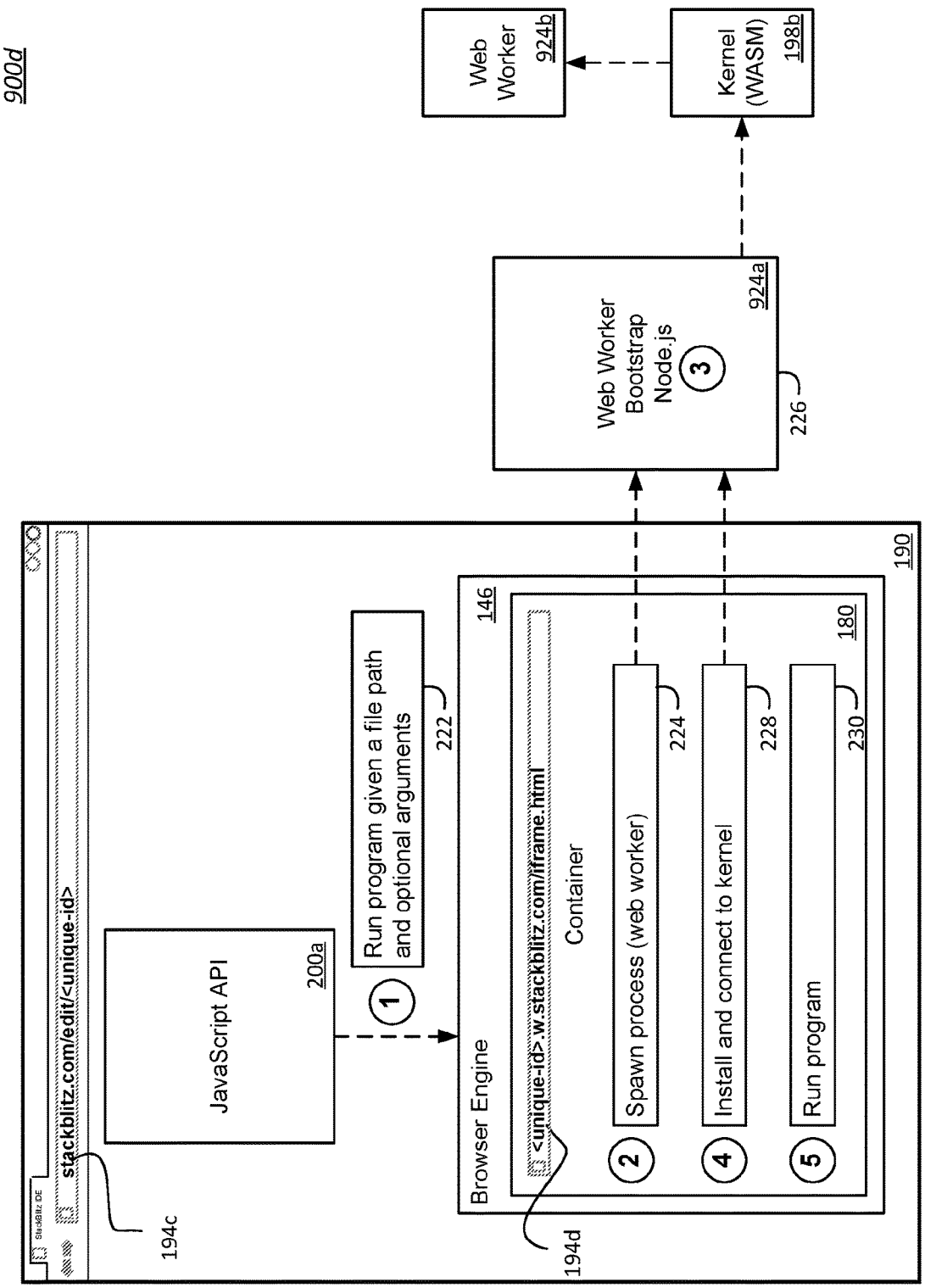
FIG. 9D is a high-level architecture of a process to use a bootstrapped system having cross-origin domain communications.

FIG. 9A is a high-level architecture 900a of a process to bootstrap a system having cross-origin domain communications. FIGS. 9B, 9C are exemplary communications 900b, 900c carried out in the bootstrapping process. FIG. 9D is a high-level architecture 900d of a process to use a bootstrapped system having cross-origin domain communications.

The architecture 900a of FIG. 9 may be implemented with the improved web browser 140 and its associated components disclosed with respect to FIGS. 4-6. While it is recognized that the teaching of FIG. 9 may be suitably applied to any type scripting language and other traditional server-side processing, the present disclosure describes an exemplary and non-limiting JavaScript architecture to avoid unnecessarily clouding the discussion presented herein.

In FIG. 9A, a browser window 192 is opened in an improved web browser 140 executing on an improved local computing device 112 (FIG. 3). The user 98 navigates to a network accessible server resource 194c (e.g., STACKBLITZ.COM/EDIT<UNIQUE-ID>). Rather than communicating outside of the local computing device 112 (FIG. 3), however, the improved browser engine 146 of the improved web browser 140 begins a process to create another domain (i.e., a cross-origin domain) that is operating in a secure runtime environment container 180 (e.g., Node.js). The unique network accessible server resource 194c, which in this case is arranged as a uniform resource locator (URL) is used to create a second unique cross-origin URL 194d ( ) e.g., <UNIQUE-ID>.W.STACKBLITZ.COM/IFRAME.HTML) where the system, either automatically or at the direction of a user, will install the secure container and execute the selected software (e.g., the user's code).

As a first act 202 in the bootstrapping process, a runtime environment application programming interface (API) 182 (e.g., JavaScript API) is downloaded. A windowless iFrame is added as a second act 204 in the bootstrapping process. The windowless iFrame will be used to communicate across the domains. In this way, software executing in a main thread at the network accessible server resource 194c URL (e.g., STACKBLITZ.COM/EDIT<UNIQUE-ID>) will be operationally isolated from software executing on a different domain, which in this case is the second unique cross-origin URL 194d ( ) e.g., <UNIQUE-ID>.W.STACKBLITZ.COM/IFRAME.HTML).

As a third act 206 in the bootstrapping process, the runtime environment API is initialized, and as a fourth act 208 in the bootstrapping process, any suitable number of web workers 924a are spawned and initialized. In at least one case, a web worker 924*a* is a fetcher worker arranged to seek, retrieve, and communicate certain data as directed, but in other cases, the web worker is arranged to perform different acts. Operations inside the runtime environment container 180, as directed by the improved browser engine 146, commence with a fifth act 210 in the bootstrapping process. Here, user code (e.g., JavaScript in this case, but many other types of software are contemplated) is downloaded and communicated to one or more web workers 924*a* for execution if and when called upon.

As a sixth act 212 in the bootstrapping process, zero or more additional web workers 924*b* may optionally be spawned and initialized. In at least one case, a file system web worker is created. And at a seventh act 214, a kernel level interface 198*b* (e.g., kernel WASM) is instantiated and initialized. The local kernel level interface 198*b* is arranged to access any number of computing resources of the local computing device 112 (FIG. 3) while remaining isolated from the main operating thread or threads of the network accessible server resource 194*c* URL.

Turning to FIGS. 9B, 9C, a non-limiting, exemplary set of communications messaging is now described. One of skill in the art will recognize the interrelated nature of the architecture in FIG. 9A with the bootstrapping communications of FIGS. 9B, 9C, and in particular, the windowless, cross-origin iframe 922 (i.e., created at the second act 204 in the bootstrapping process), the web workers 924*a*, 924*b*, and the kernel level interface 198*b*.

In FIG. 9B, a first domain runtime environment window 830 (e.g., Node.js runtime) is formed as a first tab in an improved web browser 140. A 'main' thread 916 or set of operating functions are associated with the first window 830, and these direct the operations of the bootstrapping process. In FIG. 9C, a second domain execution window 832 is visible as a second tab in the improved web browser 140.

Processing begins on the main thread 916 with a first message 502, a second message 504, and a third message 506.

In at least some cases, the first message 502 is arranged to download the runtime environment API (e.g., DOWNLOAD RUNTIME ENVIRONMENT WRAPPER VIA <SCRIPT SRC="JAVASCRIPT"> message implemented in software of the improved browser engine 146).

In at least some cases, the second message 504 is arranged to add the cross-origin iFrame 922 (e.g., an ADD CONTAINER IFRAME CONST IFRAME=DOCUMENT.CREATEELEMENT ('IFRAME')).

In at least some cases, the third message 506 is arranged to spawn and initialize any suitable number of web workers (e.g., SPAWN FETCH WORKER VIA NEW WORKER ( )).

Once the cross-origin iFrame 922 is created, the runtime environment container 180 is initialized with a fourth message 508 by downloading certain user code. The fourth message 508 in at least one case downloads JavaScript, but many other types of software are contemplated (e.g., DOWNLOAD CONTAINER VIA <SCRIPT SRC=" . . . ">).

Having set up the cross-origin iFrame and loaded the iFrame with executable software, a fifth message 510, sixth message 512, and seventh message 514 create a message communication mechanism between the first domain of the main thread 916 and the second domain where user code will be safely executed. In at least some cases, the fifth message 510 is an INIT ( ) VIA POSTMESSAGE ( ) message executed by the improved browser engine 146; the sixth message 512 is and INITIALIZE NEW CONNECTION CONST (PORT1, PORT2)=NEW MESSAGECHANNEL ( ) message executed by the improved browser engine 146; and the seventh message 514 is a RETURN PORT2 message executed by the improved browser engine 146.

Once the new page is mounted on the separate cross-origin domain inside of the iFrame 922, any number of web workers 924*a*, 924*b* can be spawned, and a kernel interface 198*b* can be initialized. The web workers 924*a*, 924*b*, communicate securely back to the main thread 916 (and vice versa) while the kernel interface 198*b* is able to execute software that accesses operating system level resources of the local computing device 112 (FIG. 3). Communications and messaging between the domains is indicated by an eighth message 516, which in at least some cases includes a POSTMESSAGE ( ) message executed by the improved browser engine 146. Any number of eighth messages 516 are executed to set up and communicate between the main thread 916 to the web workers 924*a*, 924*b* respectively inside of the cross-origin page securely.

Shared memory is set up with a ninth message 518 (e.g., an INITWORKER ( ) VIA NEW WORKER ( ) message executed by the improved browser engine 146), and the kernel interface 198*b* is established with tenth 520, eleventh 522, and twelfth 524 messages. In at least some cases, the tenth message is an INITIALIZE message executed by the improved browser engine 146. In at least some cases, the eleventh message 522 includes INSTANTIATE KERNEL VIA NEW WEBASSEMBLY MEMORY ( . . . ) and WEBASSEMBLY.INSTANTIATE ( . . . ) messages executed by the improved browser engine 146. In at least some cases, the twelfth message 524 includes a RETURN WEBASSEMBLY.MEMORY message and a WEBASSEMBLY.MODULE message executed by the improved browser engine 146. Upon setting up the kernel interface 198*b*, a thirteenth message 526 may be used to access and exercise shared memory functions. In at least some cases, the thirteenth message 526 is an INIT (MEMORY, MODULE, . . . ) VIA POSTMESSAGE( ) message executed by the improved browser engine 146.

Turning to FIG. 9D, a high-level architecture 900*d* demonstrates a non-limiting process to use the bootstrapped system having cross-origin domain communications set up in FIGS. 9A-9C. Generally, a new worker (e.g., a Node.js worker) gets spawned, and this new worker has access to the WASM kernel interface 198*b* and shared memory using the improved web browser's 140 built-in features (e.g., EVAL( )) to execute modules.

In a first act 222 in the cross-origin architecture, a program (e.g., a JavaScript program) is executed based on a given file path and optional arguments. In a second act 224 in the cross-origin architecture, a first web worker 924*a* is spawned, and in a third act 226, the user code (e.g., Node.js) is executed. The kernel interface 198*b* is installed and connected in a fourth act 228, and the program is executed in a fifth act 230 of the cross-origin architecture. The program may be any suitable program formed of runtime code of any language, configuration, and operational characteristics.

The teaching of the present disclosure brings several additional benefits to the web technology arts. For example, transient costs can be reduced. By using the processor and memory of an improved local computing device, there is no additional cost to an end-user that a remote computing server would bring. In addition, these teachings can easily be scaled to millions without overburdening network communications and resources of remote computing servers. In addition, real time operations can be achieved via zero latency. No remote computing servers are needed to proxy commands and results to and from. Instead, all execution happens on the improved local computing device. Another benefit is that features described herein can be performed substantially without a wide area network (e.g., internet) connection. Yet one more benefit is that embodiments described herein can provide an order of magnitude faster user experience. Executing programs do not have to wait for remote computing servers to send megabytes of uncompressed development builds, large files, results of complex computing, and the like over a computing network, which itself may be subject to uncontrollable delays. Succinctly, the present disclosure teaches at least one embodiment of a system that is fast, that provides real-time execution without latency, and that provides real-time feedback loops. Such systems are extremely scalable and cost effective as they do not require any remote computing servers to be provisioned per user. These systems provide for massive multitenancy, and they are secure by executing entirely within an improved web browser's improved browser engine.

Having now set forth certain embodiments, further clarification of certain terms used herein may be helpful to providing a more complete understanding of that which is considered inventive in the present disclosure.

Various figures include data flow diagrams illustrating non-limiting processes that may be used by embodiments of improved computing systems and improved browser engine embodiments as described herein. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as one or more components of a web browser 140. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments that include or otherwise cooperate with one or more computing devices. It is recognized that these computing devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

Amongst other things, the exemplary computing devices of the present disclosure (e.g., local computing device 112 of FIG. 3) may be configured in any type of mobile or stationary computing device such as a remote cloud computer, a computing server, a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device (e.g., factory robotic device, home-use robotic device, retail robotic device, office-environment robotic device), or the like. Accordingly, the computing devices include other components and circuitry that is not illustrated, such as, for example, a display, a network interface, memory, one or more central processors, camera interfaces, audio interfaces, and other input/output interfaces. In some cases, the exemplary computing devices may also be configured in a different type of low-power device such as a mounted video camera, an Internet-of-Things (IoT) device, a multimedia device, a motion detection device, an intruder detection device, a security device, a crowd monitoring device, or some other device.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of network-style computing, but there are other techniques and tools that remain available to implement run-time dynamic computing. Therefore, the claimed subject matter does not foreclose the whole or even substantial network-style computing technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific locally performed, server-side system features claimed herein. The embodiments described in the present disclosure improve upon known network-style processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform network-style operations.

Software may include a fully executable software program, a simple configuration data file, a link to additional directions, or any combination of known software types. When a computing device updates software, the update may be small or large. For example, in some cases, a computing device downloads a small configuration data file as part of a software update, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the computing systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as web browser 140, networking module 54, improved browser engine 146, or some other module or circuit may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor 20 of the local computing device 112 (FIG. 3). The computing instructions may be stored individually or as groups of instructions in files. The files may include functions, services, libraries, and the like. The files may include one or more computer programs or may be part of a larger computer program. Alternatively, or in addition, each file may include data or other computational support material useful to carry out the computing functions of an improved network computing system.

Buttons, keypads, computer mice, memory cards, serial ports, bio-sensor readers, touch screens, and the like may individually or in cooperation be useful to a software practitioner programming the improved network computing system. The devices may, for example, input control information into the system. Displays, printers, memory cards, LED indicators, temperature sensors, audio devices (e.g., speakers, piezo device, etc.), vibrators, and the like are all useful to present output information to the software practitioner operating the improved network computing system. In some cases, the input and output devices are directly coupled to the local computing device 112. and electronically coupled to a processor or other operative circuitry. In other cases, the input and output devices pass information via one or more communication ports (e.g., RS-232, RS-485, infrared, USB, etc.).

As described herein, for simplicity, a software practitioner may in some cases be described in the context of the male gender. It is understood that a software practitioner can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

The terms, "real-time" or "real time," as used herein and in the claims that follow, are not intended to imply instantaneous processing, transmission, reception, or otherwise as the case may be. Instead, the terms, "real-time" and "real time" imply that the activity occurs in a digital fashion over an acceptably short period of time (e.g., over a period of microseconds or milliseconds), and that the activity may be performed on a constant or otherwise digitally ongoing basis (e.g., maintaining a persistent actual or virtual connection with a remote computing server). An example of an activity that is not real-time is one that occurs over an extended period of time (e.g., hours or days) or that occurs based on intervention or direction by a software practitioner or other activity.

In the absence of any specific clarification related to its express use in a particular context, where the terms "substantial" or "about" or any of their cognates are used as modifiers in the present disclosure and any appended claims (e.g., to modify a structure, a dimension, a measurement, or some other characteristic), it is understood that the characteristic may vary by up to 30 percent. For example, a time between messages may be described as being about a half-second. In these cases, a message interval that is exactly one-half second is exactly 500 milliseconds. Different from the exact precision of the term, "half-second," the use of "substantially" or "about" to modify the characteristic permits a variance of the "half-second" characteristic by up to 30 percent. Accordingly, a messaging interval that is about a half-second includes messaging intervals between 350 milliseconds and 650 milliseconds.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise," as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not to be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms of "a," "an," and "the" in the present disclosure include plural referents unless the content and context clearly dictates otherwise. The conjunctive terms, "and" and "or," are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses, or sentences such that the thing following the comma is also included in the list.

The headings and Abstract of the Disclosure provided herein are for convenience only and do not interpret the scope or meaning of the embodiments.

The improved network computing systems and modules described in the present disclosure provide several technical effects and advances to the field of network-style computing.

In network-style computing (i.e., server-style network programming), a local client relies on server-side operating system application programming interface (APIs) calls to perform certain functions. An exemplary and non-exhaustive list of such functions includes file system operations (e.g., read, write, create, delete, and the like), shell/terminal scripting operations, synchronous multithreading operations, server operations (e.g., starting, pausing, resetting, stopping, and the like of transmission control protocol (TCP) servers, hypertext transfer protocol (HTTP) servers, and other servers), security operations (transport layer security (TLS), secure socket layer (SSL), and the like), encryption/decryption operations, machine learning operations, image recognition operations, virtual/augmented reality operations, and the like. To prevent or at least reduce the likelihood of any one of these operations from mistakenly or maliciously impacting the functioning of another, these operations are performed in a secure container (e.g., a sandbox, web security sandbox, quarantine space, and the like). The device, method, and system embodiments described in this disclosure (i.e., the teachings of this disclosure), and hence the technical effects and benefits of this disclosure, enable the local execution of network-style software programs within a secure container of a web browser engine operating on a local computing device. In this way, a same set of arbitrary, untrusted code that accesses operating system APIs can be executed by either or both a conventional web server 70 of a remote computing server 18 and an improved web browser 140 operating on an improved local computing device 112.

For example, the present disclosure teaches a software practitioner that interpreted programming language applications (e.g., JavaScript, WebAssembly, and others), CLOUDFLARE WORKERS, NETLIFY, FIREBASE, LAMBDA, and others, which rely on operating system APIs that might otherwise be implemented on a server-side runtime environment such as Node.js, can instead be executed inside a runtime environment container 180 of an improved web browser engine 146. Heretofore, executing Node.js required access to underlying operating system APIs, which conventional web browser engines do not provide (e.g., operating system primitives like portable operating system interface (POSIX) APIs, a shell/terminal, synchronous file system access, multithreading with synchronous operations, the ability to start TCP/HTTP web servers that are locally accessible, and the like). As taught herein, however, the improved web browser 140, and particularly the improved browser engine 146, exposes these raw operating system APIs for software practitioners to utilize in a safe, efficient, and effective cross-platform way.

In one embodiment, the JavaScript/WebAssembly (JS/WASM) runtime of the improved browser engine 146 is utilized to enable a full API set of Node.js to run inside the runtime environment container 180 (FIG. 4). Rather than porting a full operating system into a conventional web browser, the present inventors in this embodiment provided custom software patches to Node.js. Rather than directly shelling to native operating system functions as would occur in porting a full operating system, these patches instead direct API functionality into the existing JS/WASM runtime of the browser engine. In at least some cases, the improved browser engine 146 provides kernel-level APIs that are symmetrical with APIs otherwise provided on a remote computing server.

The present disclosure sets forth details of various structural embodiments that may be arranged to carry the teaching of the present disclosure. By taking advantage of the flexible circuitry, innovative software, computing architecture, and communications means described herein, a number of exemplary devices and systems are now disclosed.

Example A-1 is an improved computing system, comprising at least one processor; at least one networking module; memory having stored thereon software instructions formatted for execution by the at least one processor, said software instructions arranged to: operate a local computing server resource on a first local domain; instantiate a relay mechanism that has an iFrame and an invisible window; instantiate a local web server on a second local domain; install a service worker on the invisible window receive a request for information at the local web server; verify a presence of the local computing server resource on the first local domain; communicatively connect the second local domain to the iFrame; and directly communicate, via the at least one networking module, at least one message between the local computing server resource on the first local domain and the local web server on the second local domain using the relay mechanism.

Example A-2 may include the subject matter of Example A-1, and alternatively or additionally any other example herein, wherein the local computing server resource is arranged as a transmission control protocol (TCP) server.

Example A-3 may include the subject matter of Example A-2, and alternatively or additionally any other example herein, wherein the local web server is instantiated inside a secure container.

Example A-4 may include the subject matter of any of Examples A-1 to A-3, and alternatively or additionally any other example herein, wherein at least a portion of the relay mechanism is included inside the secure container.

Example A-5 may include the subject matter of any of Examples A-1 to A-4, and alternatively or additionally any other example herein, wherein the secure container is arranged to host at least one Node.js process.

Example A-6 may include the subject matter of any of Examples A-1 to A-5, and alternatively or additionally any other example herein, wherein the local web server is arranged to process hypertext transfer protocol (HTTP) communications.

Example A-7 may include the subject matter of any of Examples A-1 to A-6, and alternatively or additionally any other example herein, wherein the local web server is arranged to process web socket communications.

Example A-8 may include the subject matter of any of Examples A-1 to A-7, and alternatively or additionally any other example herein, wherein the local web server is arranged to process JavaScript commands.

Example A-9 may include the subject matter of any of Examples A-1 to A-8, and alternatively or additionally any other example herein, wherein the local computing server resource is accessible via a first browser window and the local web server is accessible via a second browser window.

Example A-10 may include the subject matter of any of Examples A-1 to A-9, and alternatively or additionally any other example herein, wherein the local computing resource is arranged with at least one kernel-level interface arranged to direct operations of one or more kernel-level functions.

Example B-1 is an improved computing system, comprising providing a single local computing resource that has at least one networking module; operating, within the single local computing resource, a local computing server resource on a first local domain; instantiating, within the single local computing resource, a relay mechanism that has an iFrame and an invisible window; instantiating, within the single local computing resource, a local web server on a second local domain; installing a service worker on the invisible window receiving a request for information at the local web server; verifying a presence of the local computing server resource on the first local domain; communicatively connecting the second local domain to the iFrame; and directly communicating, via the at least one networking module, at least one message between the local computing server resource on the first local domain and the local web server on the second local domain using the relay mechanism.

Example B-2 may include the subject matter of Example B-1, and alternatively or additionally any other example herein, wherein providing the single local computing resource includes arranging the single local computing resource as a transmission control protocol (TCP) server.

Example B-3 may include the subject matter of any of Examples B-1 to B-2, and alternatively or additionally any other example herein, further comprising: performing at least one kernel level act at the local web server, said kernel level act directed by a command received from the single local computing resource.

Example B-4 may include the subject matter of any of Examples B-1 to B-3, and alternatively or additionally any other example herein, further comprising: opening a first browser window on the first local domain, the first browser window associated with the local computing server resource; opening a second browser window on the second local domain, the second browser window associated with the local web server; collecting certain data from one of the first and second browser windows; and displaying at least some of the certain data at the other one of the first and second browser windows, said at least some of the certain data passed with the at least one message.

Example B-5 may include the subject matter of any of Examples B-1 to B-4, and alternatively or additionally any other example herein, wherein at least some of the certain data is a JavaScript command.

Example C-1 is an improved computing system, comprising: at least one processor; at least one networking module; memory having stored thereon software instructions formatted for execution by the at least one processor, said software instructions arranged to: initialize an improved web browser, the improved web browser including an improved browser engine; instantiate, via the improved browser engine, a transmission control protocol (TCP) server on a first domain; instantiate, via the improved browser engine, a local computing server resource on a second domain, the second domain having a different network identifier than the first domain; instantiate, via the improved browser engine, at least one local runtime environment container; allocate certain local computing resources, including memory, to the at least one local runtime environment container; grant access to the certain local computing resources to the local computing server resource and to the at least one local runtime environment container; isolate the allocated certain local computing resources from other functions of the improved computing system; and directly communicate, through the at least one local runtime environment container, messages between the local computing server resource on the first local domain and the local web server on the second local domain using the relay mechanism.

Example C-2 may include the subject matter of Example C-1, and alternatively or additionally any other example herein, wherein the improved computing system has no internet access when at least one message is directly communicated between the local computing server resource on the first local domain and the local web server on the second local domain.

Example C-3 may include the subject matter of any of Examples C-1 to C-2, and alternatively or additionally any other example herein, wherein the at least one local runtime environment container is arranged to host a Node.js runtime environment.

Example C-4 may include the subject matter of any of Examples C-1 to C-3, and alternatively or additionally any other example herein, wherein the improved computing system is a desktop computer or a laptop computer.

Example C-5 may include the subject matter of any of Examples C-1 to C-4, and alternatively or additionally any other example herein, wherein a JavaScript interpreter of the improved web browser can optionally determine if JavaScript is handled locally or remotely.

This application claims the benefit of U.S. Provisional Application No. 63/149,664, filed Feb. 16, 2021, which application is hereby incorporated by reference in its entirety.

The various embodiments described above can be combined to provide further embodiments. Various features of the embodiments are optional, and features of one embodiment may be suitably combined with other embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

The invention claimed is:

1. An improved computing system, comprising:
    at least one processor;
    at least one networking module;
    memory having stored thereon software instructions formatted for execution by the at least one processor, said software instructions arranged to:
        operate a local computing server resource on a first local domain;
        instantiate a relay mechanism that has an iFrame and an invisible window;
        instantiate a local web server on a second local domain;
        perform at least one kernel level act at the local web server, said kernel level act directed by a command received from the local computing server resource;
        open a first visible frame associated with the first local domain of the local computing server resource;
        open a second visible frame associated with the second local domain of the local web server;

collect certain data from one of the first and second visible frames;

install a service worker on the invisible window verify a presence of the local computing server resource on the first local domain;

communicatively connect the second local domain to the iFrame;

directly communicate, via the at least one networking module, at least one message between the local computing server resource on the first local domain and the local web server on the second local domain using the relay mechanism and present at least some of the certain data passed with the at least one message at the other one of the first and second visible frames.

2. The improved computing system of claim 1 wherein the local computing server resource is arranged as a transmission control protocol (TCP) server.

3. The improved computing system of claim 1 wherein the local web server is instantiated inside a secure container.

4. The improved computing system of claim 3 wherein at least a portion of the relay mechanism is included inside the secure container.

5. The improved computing system of claim 3 wherein the secure container is arranged to host at least one Node.js process.

6. The improved computing system of claim 1 wherein the local web server is arranged to process hypertext transfer protocol (HTTP) communications.

7. The improved computing system of claim 1 wherein the local web server is arranged to process web socket communications.

8. The improved computing system of claim 1 wherein the local web server is arranged to process JavaScript commands.

9. The improved computing system of claim 1 wherein the local computing server resource is accessible via a first browser window and the local web server is accessible via a second browser window.

10. The improved computing system of claim 1 wherein the local computing server resource is arranged with at least one kernel-level interface arranged to direct operations of one or more kernel-level functions.

11. An improved computing method, comprising:

providing a single local computing resource that has at least one networking module;

operating, within the single local computing resource, a local computing server resource on a first local domain;

instantiating, within the single local computing resource, a relay mechanism that has an iFrame and an invisible window;

instantiating, within the single local computing resource, a local web server on a second local domain;

performing at least one kernel level act at the local web server, said kernel level act directed by a command received from the single local computing resource;

installing a service worker on the invisible window verifying a presence of the local computing server resource on the first local domain;

opening a first visible window associated with the first local domain of the local computing server resource;

opening a second visible window associated with the second local domain of the local web server;

collecting certain data from one of the first and second visible windows;

communicatively connecting the second local domain to the iFrame;

directly communicating, via the at least one networking module, at least one message between the local computing server resource on the first local domain and the local web server on the second local domain using the relay mechanism and presenting at least some of the certain data passed with the at least one message at the other one of the first and second visible windows.

12. The improved computing method of claim 11 wherein providing the single local computing resource includes arranging the single local computing resource as a transmission control protocol (TCP) server.

13. The improved computing method of claim 11, further comprising:

receiving a request for information at the local web server.

14. The improved computing method of claim 13 wherein at least some of the certain data is a JavaScript command.

* * * * *